(12) United States Patent
Takahashi et al.

(10) Patent No.: US 10,919,358 B2
(45) Date of Patent: Feb. 16, 2021

(54) ATTITUDE ESTIMATION APPARATUS AND TRANSPORTATION MACHINE

(71) Applicant: YAMAHA HATSUDOKI KABUSHIKI KAISHA, Iwata (JP)

(72) Inventors: Go Takahashi, Shizuoka (JP); Takahiro Fujii, Shizuoka (JP)

(73) Assignee: YAMAHA HATSUDOKI KABUSHIKI KAISHA, Iwata (JP)

(*) Notice: Subject to any disclaimer, the term of this patent is extended or adjusted under 35 U.S.C. 154(b) by 226 days.

(21) Appl. No.: 16/127,746

(22) Filed: Sep. 11, 2018

(65) Prior Publication Data

US 2019/0061457 A1 Feb. 28, 2019

Related U.S. Application Data

(63) Continuation of application No. PCT/JP2017/014417, filed on Apr. 6, 2017.

(30) Foreign Application Priority Data

Apr. 6, 2016 (JP) ............................. JP2016-076544

(51) Int. Cl.
*B60G 17/019* (2006.01)
*B60W 40/11* (2012.01)
(Continued)

(52) U.S. Cl.
CPC ..... *B60G 17/01908* (2013.01); *B60G 17/015* (2013.01); *B60T 8/172* (2013.01);
(Continued)

(58) Field of Classification Search
CPC ...... B60T 8/172; B60T 8/174; B60W 40/105; B60W 40/11; B60W 40/112;
(Continued)

(56) References Cited

U.S. PATENT DOCUMENTS 6,192,305 B1    2/2001  Schiffmann
6,292,759 B1 *  9/2001  Schiffmann ............. B60T 8/172
                                                    340/440
(Continued)

FOREIGN PATENT DOCUMENTS

EP      1002709 A2    5/2000
JP      2005-061376 A 3/2005
(Continued)

OTHER PUBLICATIONS

Timucin, A Bayesian Approach to Sensor Characterization Jul. 2003 (Year: 2003).*
European Search Report dated Feb. 12, 2019.

*Primary Examiner* — Mahmoud S Ismail
*Assistant Examiner* — Gabriel Anfinrud
(74) *Attorney, Agent, or Firm* — Rabin & Berdo, P.C.

(57) ABSTRACT

An attitude estimation apparatus includes an attitude estimation unit for estimating the roll angle and pitch angle of a movable body and for using a calculation process to estimate an offset error for at least one of first, second and third angular velocity detection units and first, second and third acceleration detection units. The attitude estimation unit estimates the roll angle and pitch angle of the movable body and the offset error for at least one detection unit based on detected values from the first, second and third angular velocity detection units, detected values from the first, second and third acceleration detection units, a detected value from the velocity information detection unit, an estimated value of the roll angle from a previous estimation operation, an estimated value of the pitch angle from the previous estimation operation, and an estimated value of the offset error from the previous estimation operation.

11 Claims, 24 Drawing Sheets

(51) Int. Cl.
*B60W 40/112* (2012.01)
*B60W 40/114* (2012.01)
*B60W 40/13* (2012.01)
*B60T 8/172* (2006.01)
*B60T 8/174* (2006.01)
*G01C 9/08* (2006.01)
*B62J 99/00* (2020.01)
*B60G 17/015* (2006.01)
*B60W 40/105* (2012.01)
*B60W 50/02* (2012.01)
*B62J 45/40* (2020.01)

(52) U.S. Cl.
CPC ........... *B60T 8/174* (2013.01); *B60W 40/105* (2013.01); *B60W 40/11* (2013.01); *B60W 40/112* (2013.01); *B60W 40/114* (2013.01); *B60W 40/13* (2013.01); *B62J 99/00* (2013.01); *G01C 9/08* (2013.01); *B60W 2040/1307* (2013.01); *B60W 2050/0215* (2013.01); *B60W 2300/36* (2013.01); *B60W 2520/105* (2013.01); *B60W 2520/125* (2013.01); *B60W 2520/14* (2013.01); *B60W 2520/16* (2013.01); *B60W 2520/18* (2013.01); *B60Y 2200/12* (2013.01); *B62J 45/40* (2020.02)

(58) Field of Classification Search
CPC ............... B60W 40/114; B60W 40/13; B60W 2040/1307; B60W 2050/0215; B60W 2300/36; B60W 2520/105; B60W 2520/125; B60W 2520/14; B60W 2520/16; B60W 2520/18; B60W 40/00; B62J 99/00; B62J 45/40; G01C 9/08; B60Y 2200/12

See application file for complete search history.

(56) References Cited

U.S. PATENT DOCUMENTS

| | | | | |
|---|---|---|---|---|
| 6,684,140 | B2 * | 1/2004 | Lu ........................ | B60G 17/016 701/37 |
| 2004/0199300 | A1 * | 10/2004 | Gustafsson ........... | B60T 8/1706 701/1 |
| 2007/0156316 | A1 * | 7/2007 | Ono ..................... | B60W 40/112 701/38 |
| 2009/0276113 | A1 * | 11/2009 | Sugimoto ............. | B60T 8/1725 701/31.4 |
| 2013/0030648 | A1 * | 1/2013 | Matsumoto ........... | B60W 30/02 701/37 |
| 2014/0067155 | A1 * | 3/2014 | Yu ........................ | B60W 40/13 701/1 |
| 2014/0309803 | A1 * | 10/2014 | You ..................... | B60W 40/076 701/1 |
| 2015/0258975 | A1 * | 9/2015 | Koumura ............... | B60W 40/11 701/37 |
| 2015/0308827 | A1 | 10/2015 | Fujii | |

FOREIGN PATENT DOCUMENTS

| | | |
|---|---|---|
| JP | 2009-073466 A | 4/2009 |
| JP | 2011-073542 A | 4/2011 |
| JP | 2013-028237 A | 2/2013 |
| JP | 2013-216278 A | 10/2013 |
| JP | 2015-209106 A | 11/2015 |

* cited by examiner

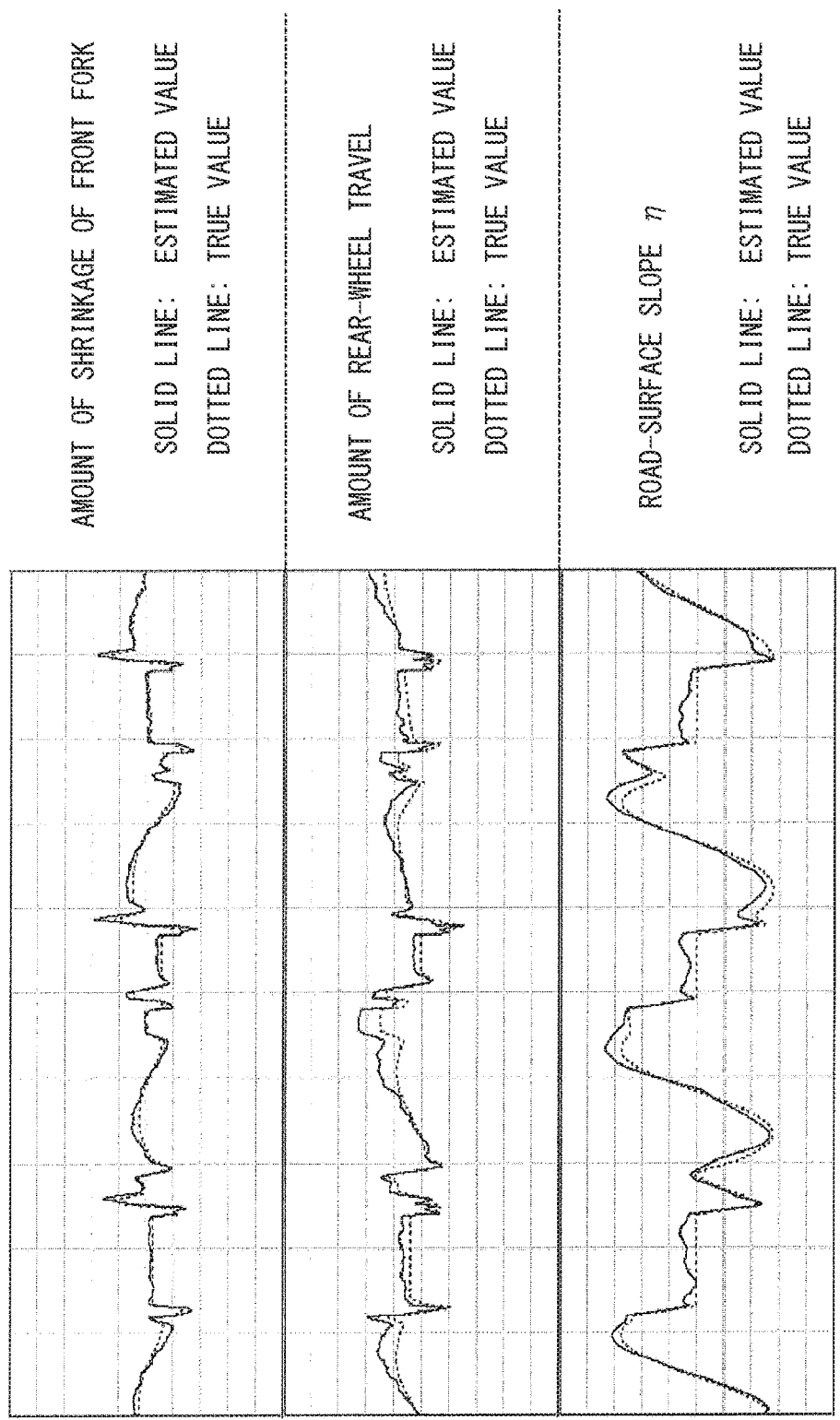

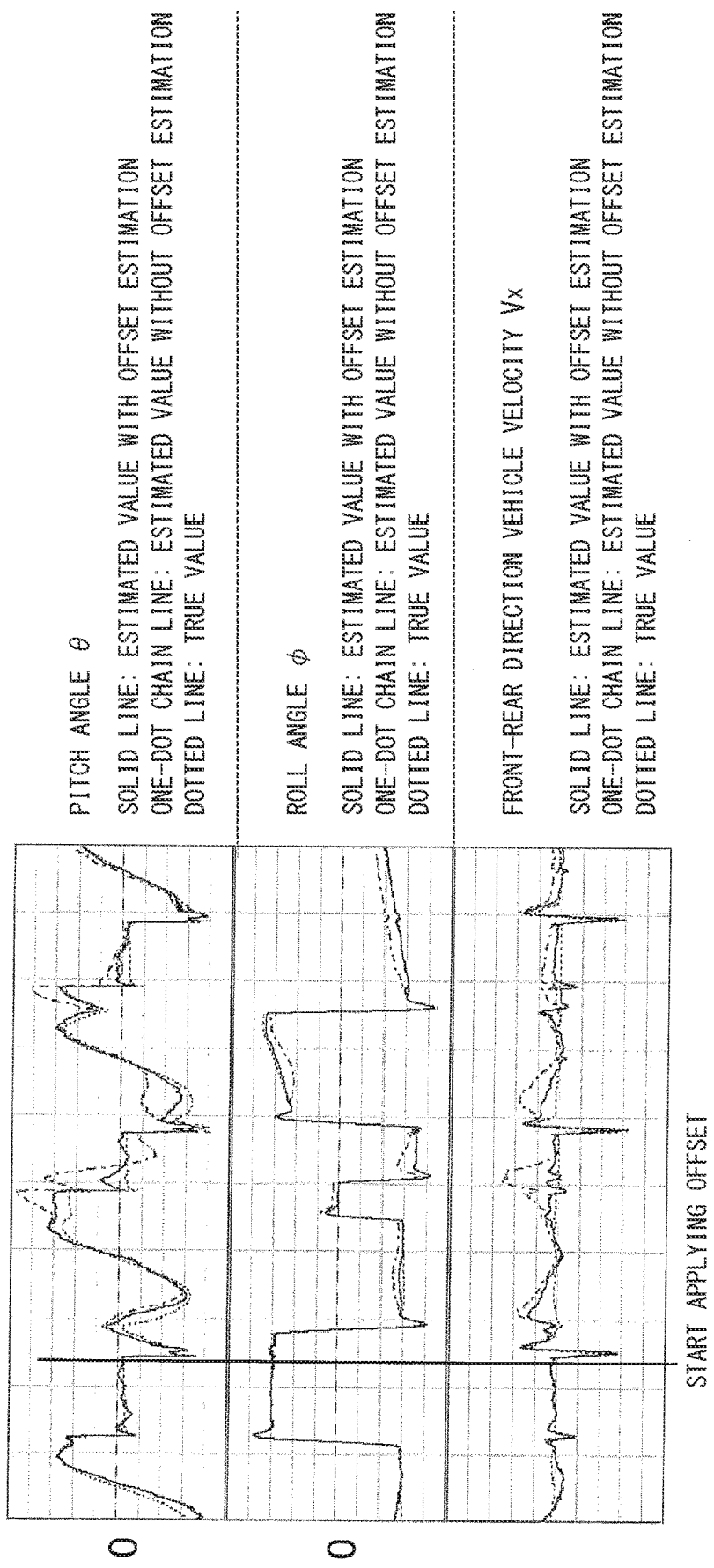

ATTITUDE ESTIMATION APPARATUS AND TRANSPORTATION MACHINE

CROSS-REFERENCE TO RELATED APPLICATIONS

This application is a continuation of International Application PCT/JP2017/014417 filed on Apr. 6, 2017, which claims priority from Japanese Patent Application No. JP2016-076544 filed on Apr. 6, 2016. The contents of each of the identified applications are entirely incorporated herein by reference.

TECHNICAL FIELD

The present teaching relates to an attitude estimation apparatus and a transportation machine including the same.

BACKGROUND ART

Various estimation apparatus for estimating the roll angle of a vehicle such as motorcycle have been proposed. For example, the direction of the lighting unit may be controlled based on a roll angle estimated by an estimation apparatus to direct light in an appropriate direction from the lighting unit regardless of the inclination of the vehicle.

Patent Document 1 describes a vehicle-attitude estimation apparatus that estimates the roll angle and pitch angle based on detected values of the front-rear acceleration, lateral acceleration, top/bottom acceleration, yaw acceleration, and roll angular velocity of the vehicle, an estimated value of the front/rear vehicle-body velocity, and an estimated value of the pitch angular velocity.

PRIOR ART DOCUMENTS

Patent Documents

Patent Document 1: JP 2009-73466 A

In recent years, it has been desired to improve the estimation accuracy of attitude estimation apparatus.

SUMMARY

An object of the present teaching is to realize an attitude estimation apparatus with improved estimation accuracy for the attitude of a movable body, and a transportation machine that includes the same.

(Arrangement 1)

Arrangement 1, which is an example of the present teaching, relates to an attitude estimation apparatus for estimating an attitude of a movable body. The attitude estimation apparatus includes:

a first angular velocity detection unit configured to detect a first angular velocity, the first angular velocity being an angular velocity of the movable body about a first axis;

a second angular velocity detection unit configured to detect a second angular velocity, the second angular velocity being an angular velocity of the movable body about a second axis, the second axis being in a different direction than that of the first axis;

a third angular velocity detection unit configured to detect a third angular velocity, the third angular velocity being an angular velocity of the movable body about a third axis, the third axis being in a different direction than those of the first axis and the second axis;

a first acceleration detection unit configured to detect a first acceleration, the first acceleration being an acceleration of the movable body in a first direction;

a second acceleration detection unit configured to detect a second acceleration, the second acceleration being an acceleration of the movable body in a second direction, the second direction being different from the first direction;

a third acceleration detection unit configured to detect a third acceleration, the third acceleration being an acceleration of the movable body in a third direction, the third direction being different from the first direction and the second direction;

a velocity information detection unit configured to detect information about a moving velocity in a direction of advance of the movable body; and an attitude estimation unit configured to estimate a roll angle and a pitch angle of the movable body and estimate, using a calculation process, an offset error for at least one of the first angular velocity detection unit, the second angular velocity detection unit, the third angular velocity detection unit, the first acceleration detection unit, the second acceleration detection unit, or the third acceleration detection unit.

In the present specification and claims, "at least one of the first angular velocity detection unit, the second angular velocity detection unit, the third angular velocity detection unit, the first acceleration detection unit, the second acceleration detection unit, or the third acceleration detection unit" means any one first angular velocity detection unit, one second angular velocity detection unit, one third angular velocity detection unit, one first acceleration detection unit, one second acceleration detection unit, or one third acceleration detection unit, individually, or any combination of the first angular velocity detection unit, the second angular velocity detection unit, the third angular velocity detection unit, the first acceleration detection unit, the second acceleration detection unit and the third acceleration detection unit.

In a current estimation operation, the attitude estimation unit estimates the roll angle and pitch angle of the movable body and the offset error for the at least one detection unit based on a detected value from the first angular velocity detection unit, a detected value from the second angular velocity detection unit, a detected value from the third angular velocity detection unit, a detected value from the first acceleration detection unit, a detected value from the second acceleration detection unit, a detected value from the third acceleration detection unit, a detected value from the velocity information detection unit, an estimated value of the roll angle from a previous estimation operation, an estimated value of the pitch angle from the previous estimation operation, and an estimated value of the offset error from the previous estimation operation.

Arrangement 1 includes a detection unit for detecting the angular velocities of the movable body in three directions, and a detection unit for detecting the accelerations of the movable body in three directions. That is, the attitude estimation apparatus is capable of detecting values for six axes. Then, based on these detected values, the apparatus estimates the offset error for at least one detection unit in addition to the roll and pitch angles of the movable body. Then, taking account of this estimated offset error, the apparatus estimates the roll angle, pitch angle and offset error of the movable body. This will improve the accuracy with which the roll angle and pitch angle of the movable body are estimated.

(Arrangement 2)

Starting from Arrangement 1, the attitude estimation unit may estimate offset errors for the first angular velocity detection unit, the second angular velocity detection unit and the third angular velocity detection unit (Arrangement 2). Arrangement 2 estimates the roll angle and pitch angle of the movable body and the current offset error taking account of the previously estimated offset error for each of the detection units. This will improve the accuracy with which the roll angle and pitch angle of the movable body are estimated.

(Arrangement 3)

Starting from Arrangement 1 or 2, the attitude estimation unit may be configured to further estimate the moving velocity in the direction of advance of the movable body.

(Arrangements 4 and 5)

Starting from any one of Arrangements 1 to 3, the attitude estimation unit may estimate an offset error for the first acceleration detection unit, the second acceleration detection unit or the third acceleration detection unit (Arrangement 4). As an example of Arrangement 4, if the first acceleration detection unit detects an acceleration of the movable body in a top-bottom direction, the attitude estimation unit may estimate the offset error for the first acceleration detection unit (Arrangement 5).

(Arrangement 6)

Starting from any one of Arrangements 1 to 5, the first angular velocity detection unit may detect a roll angular velocity of the movable body, the second angular velocity detection unit may detect a yaw acceleration of the movable body, and the third angular velocity detection unit may detect a pitch angular velocity of the movable body (arrangement 6).

Further, as an example, the first acceleration detection unit may detect an acceleration of the movable body in the top-bottom direction, the second acceleration detection unit may detect an acceleration of the movable body in a front-rear direction, and the first acceleration detection unit may detect an acceleration of the movable body in a left-right direction.

(Arrangement 7)

Starting from any one of Arrangements 1 to 6, the attitude estimation unit may include a Kalman filter configured to, in the current estimation operation, estimate the roll angle and pitch angle of the movable body and the offset error for the at least one detection unit using a relationship between the detected value from the first angular velocity detection unit, the detected value from the second angular velocity detection unit, the detected value from the third angular velocity detection unit, the detected value from the first acceleration detection unit, the detected value from the second acceleration detection unit, the detected value from the third acceleration detection unit, the detected value from the velocity information detection unit, the estimated value of the roll angle from the previous estimation operation, the estimated value of the pitch angle from the previous estimation operation, and the estimated value of the offset error from the previous estimation operation.

(Arrangement 8)

Starting from Arrangement 7, in the current estimation operation, the Kalman filter may estimate the roll angle and pitch angle of the movable body and the offset error for the at least one detection unit using a characteristic equation in which a value of a predetermined function is a constant, the function having, as its elements, the detected value from the first angular velocity detection unit, the detected value from the second angular velocity detection unit, the detected value from the third angular velocity detection unit, the detected value from the first acceleration detection unit, the estimated value of the roll angle from the previous estimation operation, the estimated value of the pitch angle from the previous estimation operation, and the estimated value of the offset error from the previous estimation operation.

In Arrangement 8, a characteristic equation is used to estimate an offset error for a new detection unit. This will improve the estimation accuracy of the roll angle and pitch angle of the movable body. This characteristic equation may be, for example, an equation derived from an equation of a rotary motion of the movable body about the first axis (Arrangement 9).

(Arrangement 10)

Starting from any one of Arrangements 1 to 9, the attitude estimation apparatus may include:

a load estimation unit configured to estimate a load applied to at least one of a front wheel and a rear wheel included in the movable body, where the load estimation unit may estimate the load based on the detected value from the first angular velocity detection unit, the detected value from the second angular velocity detection unit, the detected value from the third angular velocity detection unit, the detected value from the first acceleration detection unit, the detected value from the second acceleration detection unit, the detected value from the third acceleration detection unit, the detected value from the velocity information detection unit, and the roll angle of the movable body, the pitch angle of the movable body and the offset error for the at least one detection unit estimated by the attitude estimation unit.

(Arrangement 11)

Starting from Arrangement 10, the attitude estimation apparatus may include:

a suspension stroke quantity estimation unit configured to estimate a stroke quantity of a suspension provided on at least one of the front wheel and the rear wheel of the movable body, where the load estimation unit may estimate the loads applied to both the front wheel and the rear wheel provided on the movable body, and the suspension stroke quantity estimation unit may estimate the stroke quantity of the suspension based on estimated values of the loads applied to both the front wheel and the rear wheel estimated by the load estimation unit.

(Arrangement 12)

Starting from Arrangement 11, the attitude estimation apparatus may include:

an elevation/depression angle estimation unit configured to estimate an elevation/depression angle based on an estimated value of the stroke quantity of the suspension estimated by the suspension stroke quantity estimation unit, the elevation/depression angle being an angle between an axis in a vehicle-body coordinate system fixed to the movable body and an axis in a road-surface coordinate system fixed to a road surface in contact with the front wheel or the rear wheel. Since Arrangement 12 is capable of estimating the elevation/depression angle of the movable body, it will estimate the attitude of the movable body with a still higher accuracy.

(Arrangement 13)

Starting from Arrangement 12, the attitude estimation unit may estimate the roll angle and pitch angle of the movable body and the offset error for the at least one detection unit taking account of an estimated value of the elevation/depression angle estimated by the elevation/depression angle estimation unit.

(Arrangement 14)

Starting from Arrangement 12 or 13, the attitude estimation apparatus may further include:

a slope estimation unit configured to estimate a longitudinal slope of the road surface on which the movable body is placed based on the estimated value of the elevation/depression angle estimated by the elevation/depression angle estimation unit and estimated values of the roll angle and the pitch angle of the movable body estimated by the attitude estimation unit.

Arrangement 14 will estimate the slope of the road surface accurately.

A transportation machine including the movable body and the attitude estimation apparatus based on one of Arrangements 1 to 14 is one embodiment of the present teaching.

Effects of the Invention

The present teaching will improve the estimation accuracy for the attitude of a movable body.

BRIEF DESCRIPTION OF THE DRAWINGS

FIG. 13B illustrates how the estimated values of various parameters change over time.

FIG. 13D illustrates how the estimated values of various parameters change over time.

DETAILED DESCRIPTION

Figure 1:
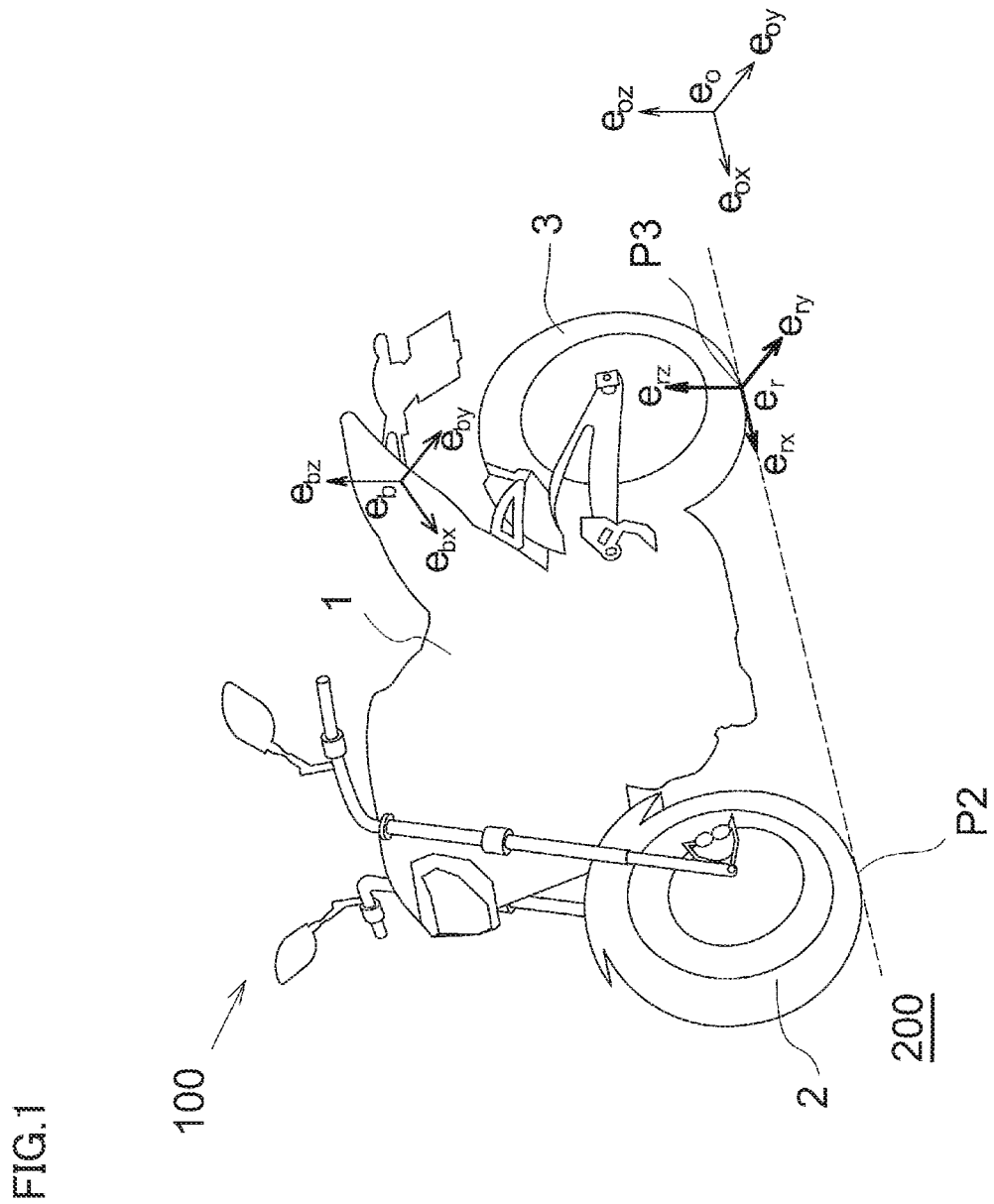
FIG. 1 illustrates the relationship between the basis vector $e_o$ of an inertia coordinate system, the basis vector $e_b$ of a vehicle coordinate system, and the basis vector $e_r$ of a road-surface coordinate system.

Embodiments of the present teaching will be described with reference to the drawings. In the drawings referred to below, the size ratios in the drawings and the actual size ratios are not necessarily identical.

<Definitions>

The coordinate axes will be defined below with reference to the drawings. FIG. 1 illustrates the relationship between the basis vector $e_o$ of an inertia coordinate system, the basis vector $e_b$ of a vehicle coordinate system, and the basis vector $e_r$ of a road-surface coordinate system. In the following formulas, vectors may be expressed by bold letters. Each coordinate system includes an x-axis, a y-axis, and a z-axis. In FIG. 1, the vehicle 100 that represents a reference with respect to which a vehicle coordinate system and a road-surface coordinate system are set is a motorcycle.

[Formula 1]

$$e_o = (e_{ox}, e_{oy}, e_{oz})$$

$$e_b = (e_{bx}, e_{by}, e_{bz})$$

$$e_r = (e_{rx}, e_{ry}, e_{rz})$$

The inertia coordinate system $e_o$ is a coordinate system fixed to the horizontal plane of the earth, and the z-axis is defined as the upward vertical direction, i.e. direction of gravity.

In the vehicle coordinate system $e_b$, when the vehicle is standing upright on the horizontal road surface, the x- and y-axes are in the horizontal plane and the x-axis is fixed to the vehicle body so as to be the forward direction with respect to the vehicle. The angle formed by the vehicle coordinate system $e_b$ and the inertia coordinate system $e_o$ changes as the suspension of the vehicle moves. The suspension is a shock absorber provided between the vehicle wheels 2 and 3 and the vehicle body 1.

In the road-surface coordinate system $e_r$, the y-axis is the same as the y-axis of the vehicle coordinate system $e_b$, and the vehicle coordinate system $e_b$ has been rotated about the y-axis such that the direction extending from the grounding point P3 between the rear wheel 3 and road surface 200 to the grounding point P2 between the front wheel 2 and road surface 200 is the same as the x-axis.

As used herein, "yaw angle" means a rotational angle about the z-axis of the inertia coordinate system $e_o$ ($e_{oz}$), "yaw angular velocity" means a rate of change over time of the "yaw angle", and "yaw angular acceleration" means a rate of change over time of the yaw angular velocity. As used herein, "pitch angle" means a rotational angle about the y-axis of the inertia coordinate system $e_o$ ($e_{oy}$), "pitch angular velocity" means a rate of change over time of the "pitch angle", and "pitch angular acceleration" means a rate of change over time of the pitch angular velocity. As used herein, "roll angle" means a rotational angle about the x-axis of the vehicle coordinate system $e_b$ ($e_{bx}$), "roll angular velocity" means a rate of change over time of the "roll angle", and "roll angular acceleration" means a rate of change over time of the roll angular velocity.

As used herein, "top-bottom direction" means the direction of the z-axis of the vehicle coordinate system $e_b$ ($e_{bz}$), "front-rear direction" means the direction of the x-axis of the vehicle coordinate system $e_b$ ($e_{bx}$), and "left-right direction" means the direction of the y-axis of the vehicle coordinate system $e_b$ ($e_{by}$).

Roll angle, roll angular velocity, roll angular acceleration, yaw angle, yaw angular velocity, yaw angular acceleration, pitch angle, pitch angular velocity, pitch angular acceleration, top-bottom acceleration, front-rear acceleration, and left-right acceleration will be denoted by the following characters. One dot on the character denoting a parameter means first-order temporal differential.

TABLE 1

| Parameter | Meaning |
| --- | --- |
| $\phi$ | roll angle |
| $\omega_{ro}$ | roll angular velocity |
| $\dot{\omega}_{ro}$ | roll angular acceleration |
| $\psi$ | yaw angle |
| $\omega_{ya}$ | yaw angular velocity |
| $\dot{\omega}_{ya}$ | yaw angular acceleration |
| $\theta$ | pitch angle |
| $\omega_{pi}$ | pitch angular velocity |
| $\dot{\omega}_{pi}$ | pitch angular acceleration |
| $G_z$ | top-bottom acceleration |
| $G_x$ | front-rear acceleration |
| $G_y$ | left-right acceleration |

<Vehicle>

Figure 2:
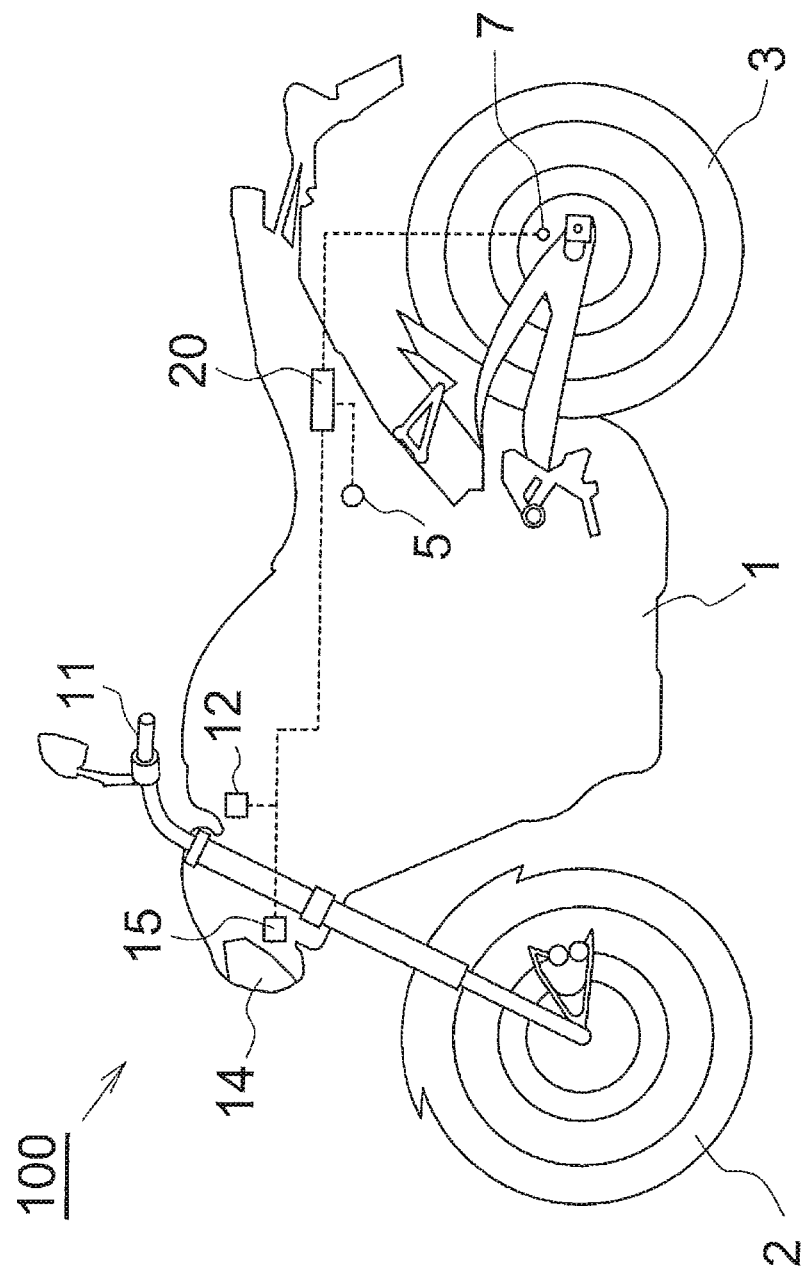
FIG. 2 is a schematic view of a vehicle including an attitude estimation apparatus according to an embodiment.

FIG. 2 is a schematic view of a vehicle including an attitude estimation apparatus according to the present embodiment. The vehicle 100 shown in FIG. 2 is a motorcycle.

As shown in FIG. 2, the vehicle 100 includes a vehicle body 1. A front wheel 2 is attached to a front portion of the vehicle body 1, and a rear wheel 3 is attached to a rear portion of the vehicle body 1. Further, a group of sensors 5 are attached to a central portion of the vehicle body 1. The group of sensors 5 will be described in detail further below.

A rear-wheel velocity sensor 7 is attached to the wheel body of the rear wheel 3 for detecting the rotational velocity of the rear wheel 3. According to the present embodiment, the rear-wheel velocity sensor 7 corresponds to the "velocity information detection unit".

Handlebars 11 are attached to the top of the front portion of the vehicle body 1 so as to be swingable to the left and right. In the implementation shown in FIG. 1, a navigation system 12 is provided near the handlebars 11, and a headlight 14 and a headlight driving device 15 are provided on the front portion of the vehicle body 1. The headlight driving device 15 controls the direction of the headlight 14. An electronic control unit 20 is provided on the rear portion of the vehicle body 1. The electronic control unit 20 will be referred to simply as "ECU 20" as appropriate below. The positions of the ECU 20 and the group of sensors 5 are not limited to those in FIG. 2.

Output signals from the group of sensors 5 and rear-wheel velocity sensor 7 are provided to the ECU 20. The ECU 20 controls the various parts of the vehicle body 1, and estimates the roll angle and pitch angle of the vehicle body 1, and provides these estimated values to the navigation system 12 and headlight driving device 15, for example.

According to the present embodiment, the group of sensors 5, rear-wheel velocity sensor 7 and ECU 20 constitute the attitude estimation apparatus.

<Configuration of Attitude Estimation Apparatus>

Figure 3:
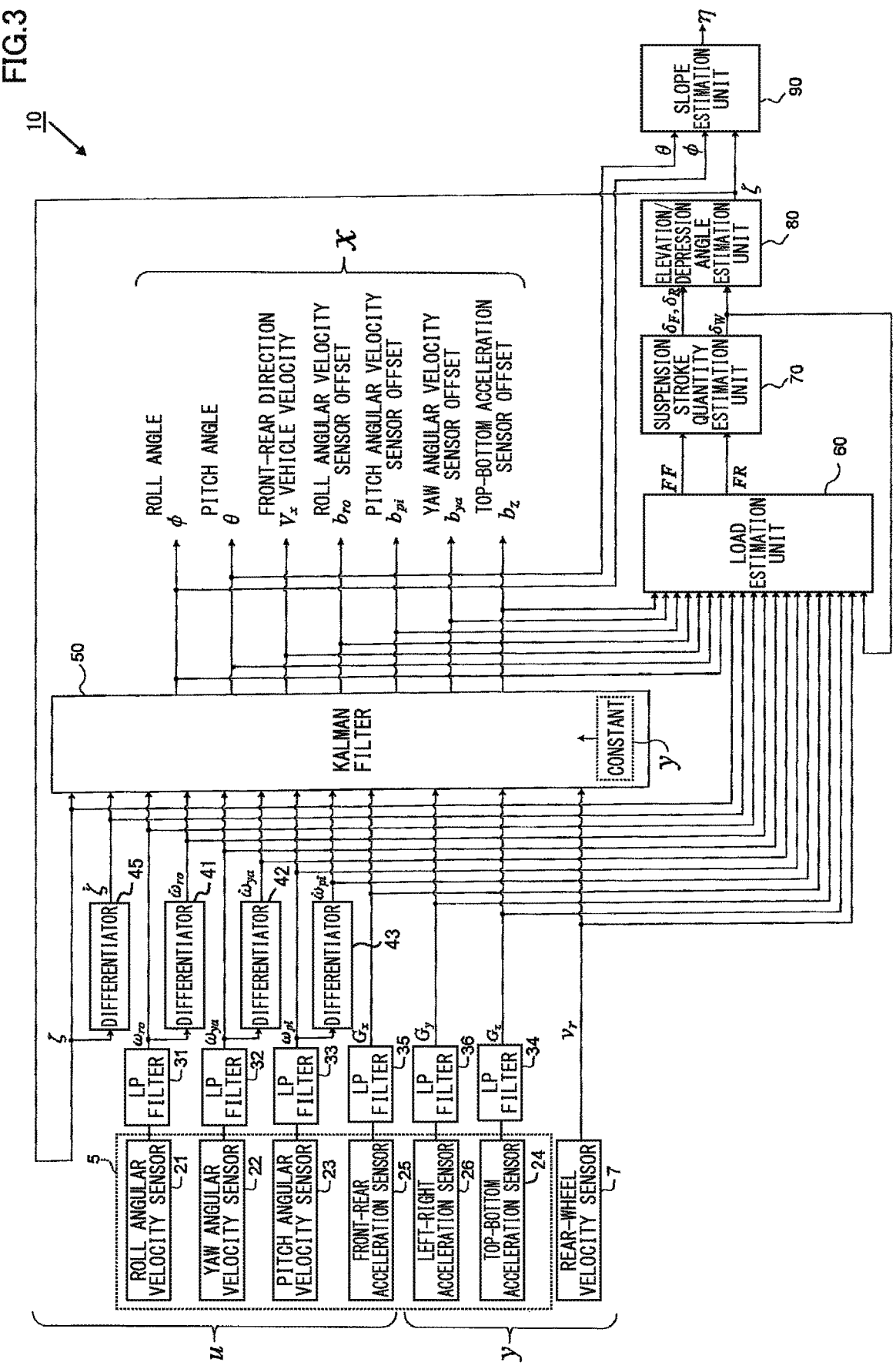
FIG. 3 is a schematic block diagram of an exemplary configuration of the attitude estimation apparatus.

FIG. 3 is a schematic block diagram of an exemplary configuration of the attitude estimation apparatus. The attitude estimation apparatus 10 shown in FIG. 3 includes the group of sensors 5, the rear-wheel velocity sensor 7, low-pass filters 31, 32, 33, 34, 35 and 36, differentiators 41, 42, 43 and 45, a Kalman filter 50, a load estimation unit 60, a suspension stroke quantity estimation unit 70, an elevation/depression angle estimation unit 80, and a slope estimation unit 90. The functionalities of the Kalman filter 50, load estimation unit 60, suspension stroke quantity estimation unit 70, elevation/depression angle estimation unit 80 and slope estimation unit 90 are realized by the ECU 20 shown in FIG. 2 operating in accordance with a program, for example. The Kalman filter 50 corresponds to the "attitude estimation unit".

The group of sensors 5 include a roll angular velocity sensor 21, a yaw angular velocity sensor 22, a pitch angular velocity sensor 23, a top-bottom acceleration sensor 24, a front-rear acceleration sensor 25 and a left-right acceleration sensor 26.

The roll angular acceleration sensor 21 is provided on the vehicle body 1 so as to detect the roll angular velocity of the vehicle body 1. The yaw angular velocity sensor 22 is provided on the vehicle body 1 so as to detect the yaw angular velocity of the vehicle body 1. The pitch angular velocity sensor 23 is provided on the vehicle 1 so as to detect the pitch angular velocity of the vehicle body 1. According to the present embodiment, the roll angular velocity sensor 21 corresponds to the "first angular velocity detection unit", the yaw angular velocity sensor 22 corresponds to the "second angular velocity detection unit", and the pitch angular velocity sensor 23 corresponds to the "third angular velocity detection unit".

The top-bottom acceleration sensor 24 is provided on the vehicle body 1 so as to detect the top-bottom acceleration of the vehicle body 1. The front-rear acceleration sensor 25 is provided on the vehicle body 1 so as to detect the front-rear acceleration of the vehicle body 1. The left-right acceleration sensor 26 is provided on the vehicle body 1 so as to detect the left-right acceleration of the vehicle body 1. According to the present embodiment, the top-bottom acceleration sensor 24 corresponds to the "first acceleration detection unit", the front-rear acceleration sensor 25 corresponds to the "second acceleration detection unit", and the left-right acceleration sensor 26 corresponds to the "third acceleration detection unit".

In this exemplary implementation, the top-bottom acceleration sensor 24, front-rear acceleration sensor 25 and left-right acceleration sensor 26 detect the accelerations in directions that are perpendicular to each other. This is not essential and it is only required that the top-bottom acceleration sensor 24, front-rear acceleration sensor 25 and left-right acceleration sensor 26 be capable of detecting the accelerations in at least three different directions.

The output signal from the roll angular velocity sensor 21 is passed through the low-pass filter 31 and is fed into the Kalman filter 50 and differentiator 41 as a roll angular velocity. The low-pass filter 31 removes noise from the output signal from of the roll angular velocity sensor 21. The differentiator 41 provides, to the Kalman filter 50, the differential value of the roll angular velocity as a roll angular acceleration.

The output signal from the yaw angular velocity sensor 22 is passed through the low-pass filter 32 and is fed into the Kalman filter 50 and differentiator 42 as a yaw angular velocity. The low-pass filter 32 removes noise from the output signal from the yaw angular velocity sensor 22. The differentiator 42 provides, to the Kalman filter 50, the differential value of the yaw angular velocity as a yaw angular acceleration.

The output signal from the pitch angular velocity sensor 23 is passed through the low-pass filter 33 and is fed into the Kalman filter 50 and differentiator 43 as a pitch angular velocity. The low-pass filter 33 removes noise from the output signal from the pitch angular velocity sensor 23. The differentiator 43 provides, to the Kalman filter 50, the differential value of the pitch angular velocity as a pitch angular acceleration.

The output signal from the top-bottom acceleration sensor 24 is passed through the low-pass filter 34 and is provided to the Kalman filter 50 as a top-bottom acceleration. The output signal from the front-rear acceleration sensor 25 is passed through the low-pass filter 35 and is fed into the Kalman filter 50 as a front-rear acceleration. The output signal from the left-right acceleration sensor 26 is passed through the low-pass filter 36 and is provided to the Kalman filter 50 as a left-right acceleration.

The frequency characteristics of the low-pass filters 31, 32, 33, 34, 35 and 36 are decided depending on the output characteristics of the corresponding sensors 21, 22, 23, 24, 25 and 26. More specifically, the frequency characteristics of the noise components contained in the output signals from the sensors 21, 22, 23, 24, 25 and 26 can be identified in advance, at the stage of apparatus design. The low-pass filters 31, 32, 33, 34, 35 and 36 may be designed to block these noise components and pass the detection signals of the sensors 21, 22, 23, 24, 25 and 26, which will be needed.

The output signal from the rear-wheel velocity sensor 7 is fed into the Kalman filter 50 as a rear-wheel velocity. The rear-wheel velocity is a rotational velocity of the outermost periphery of the tire, assuming that there is no slide between the road surface and the tire of the rear wheel 3 and, in reality, calculated based on the output signal of the rear-wheel velocity sensor 7 and the size of the tire. To simplify the explanation, FIG. 3 shows a signal indicative of rear-wheel velocity as if it were provided by the rear-wheel velocity sensor 7.

As discussed above, the Kalman filter 50 receives detected values relating to roll angular velocity, roll angular acceleration, yaw acceleration, yaw angular acceleration, pitch angular velocity, pitch angular acceleration, top-bottom acceleration, front-rear acceleration, left-right acceleration, and rear-wheel velocity. Based on these values, the Kalman filter 50 estimates the roll angle, pitch angle, front-rear direction vehicle velocity, roll angular velocity sensor offset, yaw angular velocity sensor offset, pitch angular velocity sensor offset and top-bottom acceleration sensor offset before outputting them.

The attitude estimation apparatus 10 of the present embodiment includes an elevation/depression angle estimation unit 80, and an estimated value of the elevation/depression angle $\zeta$ from the elevation/depression angle estimation unit 80 is provided to the Kalman filter 50.

The roll angular velocity sensor offset is the offset error for the roll angular velocity sensor 21. The yaw angular velocity sensor offset is the offset error for the yaw angular velocity sensor 22. The pitch angular velocity sensor offset is the offset error for the pitch angular velocity sensor 23. The top-bottom acceleration sensor offset is the offset error for the top-bottom acceleration sensor 24.

The rear-wheel velocity detected by the rear-wheel velocity sensor 7, and the front-rear direction vehicle velocity, roll angular velocity sensor offset, yaw angular velocity sensor offset, pitch angular velocity sensor offset, and top-bottom acceleration sensor offset estimated by the Kalman filter 50, as well as the elevation/depression angle estimated by the elevation/depression angle estimation unit 80 and the first-order differential value of the elevation/depression angle will be denoted by the following characters.

TABLE 2

| Parameter | Meaning |
| --- | --- |
| $v_r$ | rear-wheel velocity |
| $V_x$ | front-rear direction vehicle velocity |
| $b_{ro}$ | roll angular velocity sensor offset |
| $b_{ya}$ | yaw angular velocity sensor offset |
| $b_{pi}$ | pitch angular velocity sensor offset |
| $b_z$ | top-bottom acceleration sensor offset |
| $\zeta$ | elevation/depression angle |
| $\dot{\zeta}$ | differential value of elevation/depression angle |

Figure 4:
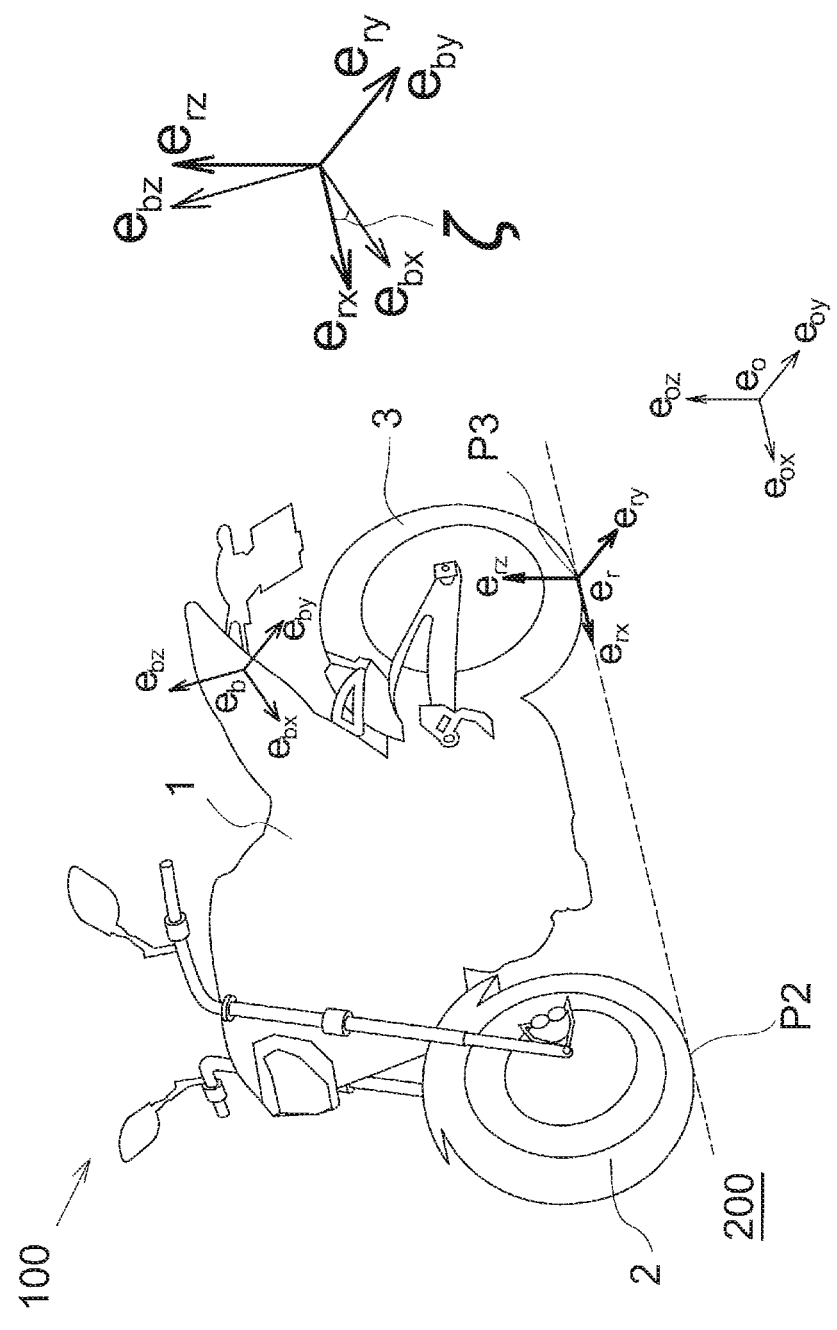
FIG. 4 illustrates an elevation/depression angle.

FIG. 4 illustrates the elevation/depression angle $\zeta$. The elevation/depression angle $\zeta$ is defined as the angle formed by the road-surface coordinate system $e_r$ and vehicle coordinate system $e_b$ found when a stroke quantity of the suspension of the vehicle 100 is present. In the following description, the elevation/depression angle $\zeta$ is the angle formed by the x-axis $e_{bx}$ of the vehicle coordinate system $e_b$ and the x-axis $e_{rx}$ of the road-surface coordinate system.

The Kalman filter 50 according to the present embodiment uses the roll angular velocity sensor 21, yaw angular velocity sensor 22, pitch angular velocity sensor 23, top-bottom acceleration sensor 24, front-rear acceleration sensor 25, left-right acceleration sensor 26 and rear-wheel velocity sensor 7 to derive the seven relational expressions in Equations 43 and 44, provided below. These relational expressions are used to estimate three parameters, i.e. pitch angle $\theta$, roll angle $\varphi$ and front-rear direction vehicle velocity $V_x$. That is, there is redundancy between the number of relational expressions and the number of output estimated values. In other words, the number of relational expressions is larger than the number of output estimated values. The Kalman filter 50 may use this redundancy to further estimate the roll angular velocity sensor offset $b_{ro}$, the yaw angular velocity sensor offset $b_{ya}$, the pitch angular velocity sensor offset $b_{pi}$, and the top-bottom acceleration sensor offset $b_z$. Further, if the attitude estimation apparatus 10 includes an elevation/depression angle estimation unit 80 as shown in FIG. 3, the apparatus may estimate the values taking account of the estimated value of the elevation/depression angle $\zeta$.

<Configuration of Kalman Filter>

Figure 5:
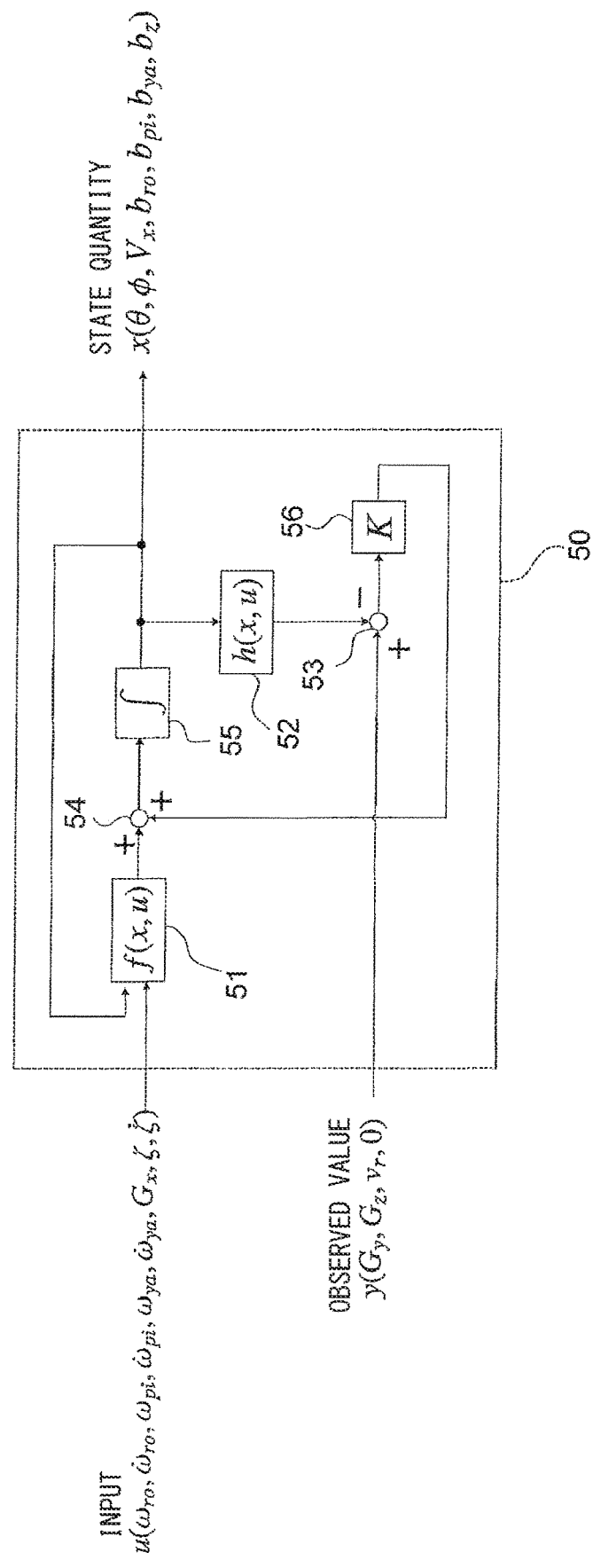
FIG. 5 is a schematic block diagram illustrating an example Kalman filter configuration.

FIG. 5 is a schematic block diagram of an exemplary configuration of the Kalman filter 50. The Kalman filter 50 shown in FIG. 5 uses a kinematic model for the vehicle 100, described below.

Referring to FIG. 5, the Kalman filter 50 includes a system equation calculation unit 51, an observation equation calculation unit 52, a subtractor 53, an adder 54, an integrator 55, and a Kalman gain calculation unit 56. The system equation that is an equation used for the calculation at the system equation calculation unit 51 includes the function f(x,u). The observation equation that is an equation used for the calculation at the observation equation calculation unit 52 includes the function h(x,u). The Kalman gain calculation unit 56 includes a seventh-degree Kalman gain K. The calculation units 51, 52, 53, 54, 55 and 56 constituting the Kalman filter 50 may be implemented by, for example, a program that has been prepared in advance being performed by the ECU 20. Alternatively, some or all of the calculation units 51, 52, 53, 54, 55 and 56 may be implemented by mounted independent hardware.

In the current estimation operation, the following values are provided as the input parameter u of the function f(x,u) included in the system equation: the detected value of the roll angular velocity $\omega_{ro}$), the detected value of the roll angular acceleration (differential value of the roll angular velocity $\omega_{ro}$), the detected value of the yaw angular velocity $\omega_{ya}$, the yaw angular acceleration (differential value of the yaw angular velocity $\omega_{ya}$), the detected value of the pitch angular velocity $\omega_{pi}$, the detected value of the pitch angular acceleration (differential value of the pitch angular velocity $\omega_{pi}$) and the detected value of the front-rear acceleration $G_x$. Further, according to the present embodiment, the following values are provided as the input parameter u: the detected value of the elevation/depression angle ζ provided by the elevation/depression angle estimation unit 80, and the elevation/depression angular velocity (differential value of the elevation/depression angle ζ).

Further, the following values are provided as the input parameter x of the function f(x,u) included in the system equation: the estimated value of the roll angle φ, the estimated value of the pitch angle θ, the estimated value of the vehicle velocity $V_x$, the estimated value of the roll angular velocity sensor offset $b_{ro}$, the estimated value of the yaw angular velocity sensor offset $b_{ya}$, the estimated value of the pitch angular velocity sensor offset $b_{pi}$, and the estimated value of the top-bottom acceleration sensor offset $b_z$ from the previous estimation operation.

The output from the system equation calculation unit 51 is the predicted differential value of the roll angle φ, the predicted differential value of the pitch angle θ, the predicted differential value of the vehicle velocity $V_x$, the predicted differential value of the roll angular velocity sensor offset $b_{ro}$, the predicted differential value of the yaw angular velocity sensor offset $b_{ya}$, the predicted differential value of the pitch angular velocity sensor offset $b_{pi}$, and the predicted differential value of the top-bottom acceleration sensor offset $b_z$.

The adder 54 adds the seventh-degree Kalman gain K obtained by the previous estimation operation to the predicted differential value of the roll angle φ, the predicted differential value of the pitch angle θ, the predicted differential value of the vehicle velocity $V_x$, the predicted differential value of the roll angular velocity sensor offset $b_{ro}$, the predicted differential value of the yaw angular velocity sensor offset $b_{ya}$, the predicted differential value of the pitch angular velocity sensor offset $b_{pi}$, and the predicted differential value of the top-bottom acceleration sensor offset $b_z$.

The predicted differential value of the roll angle φ, the predicted differential value of the pitch angle θ, the predicted differential value of the vehicle velocity $V_x$, the predicted differential value of the roll angular velocity sensor offset $b_{ro}$, the predicted differential value of the yaw angular velocity sensor offset $b_{ya}$, the predicted differential value of the pitch angular velocity sensor offset $b_{pi}$, and the predicted differential value of the top-bottom acceleration sensor offset $b_z$, to which the Kalman gain K has been added are integrated by the integrator 55. This provides the estimated value of the roll angle φ, the estimated value of the pitch angle θ, the estimated value of the vehicle velocity $V_x$, the estimated value of the roll angular velocity sensor offset $b_{ro}$, the estimated value of the yaw angular velocity sensor offset $b_{ya}$, the estimated value of the pitch angular velocity sensor offset $b_{pi}$, and the estimated value of the top-bottom acceleration sensor offset $b_z$, from the current estimation operation.

The following values are provided as the input parameter x of the function h(x,u) included in the observation equation: the estimated value of the roll angle φ, the estimated value of the pitch angle θ, the estimated value of the vehicle velocity $V_x$, the estimated value of the roll angular velocity sensor offset $b_{ro}$, the estimated value of the yaw angular velocity sensor offset $b_{ya}$, the estimated value of the pitch angular velocity sensor offset $b_{pi}$, and the estimated value of the top-bottom acceleration sensor offset $b_z$.

The output from the observation equation calculation unit 52 is the calculated value of the top-bottom acceleration $G_z$, the calculated value of the left-right acceleration $G_y$, the calculated value of the rear-wheel velocity $v_r$, and the calculated value of the characteristic equation discussed below.

The Kalman filter 50 receives, as the input parameter y, the detected value of the top-bottom acceleration $G_z$, the detected value of the left-right acceleration $G_y$, the detected value of the rear-wheel velocity $v_r$ and a constant that serves as the detected value of the characteristic equation. The Kalman gain calculation unit 56 calculates the Kalman gain K based on the differences between the detected values of the top-bottom acceleration $G_z$, left-right acceleration $G_y$, rear-wheel velocity $v_r$ and characteristic equation, and the calculated values. In the description further below, the detected value of the characteristic equation is zero; however, it is not limited to zero and may be any constant that does not change over time.

Finding this kinematic model's system equation f(x,u) and observation equation h(x,u) gives the relational expression for the input parameters u and y and the output parameter x.

<Finding of System Equation and Observation Equation>

The present embodiment supposes the following points to simplify the kinematic model.

(a) There is no rotational slide between the rear wheel 3 and road surface.

(b) The side-skid velocity of the rear wheel 3 is zero.

(c) The road surface is flat. "Flat" as used herein means a plane without irregularities, and may be inclined.

Based on suppositions (a) to (c), the kinematic model equation is found in the following manner. The differential value of the yaw angle, the differential value of the pitch angle, and the differential value of the roll angle will be denoted by the following characters.

TABLE 3

| Parameter | Meaning |
| --- | --- |
| $\dot{\phi}$ | differential value of roll angle |
| $\dot{\psi}$ | differential value of yaw angle |
| $\dot{\theta}$ | differential value of pitch angle |

First, the following equation may be established based on a common relational expression between Euler angle and angular velocity.

[Formula 2]

$$\begin{bmatrix} \dot{\phi} \\ \dot{\theta} \\ \dot{\psi} \end{bmatrix} = \begin{bmatrix} 1 & \tan\theta \sin\phi & \tan\theta \cos\phi \\ 0 & \cos\phi & -\sin\phi \\ 0 & \sin\phi \sec\theta & \cos\phi \sec\theta \end{bmatrix} \begin{bmatrix} \omega_{ro} \\ \omega_{pi} \\ \omega_{ya} \end{bmatrix} \quad (1)$$

Figure 6:
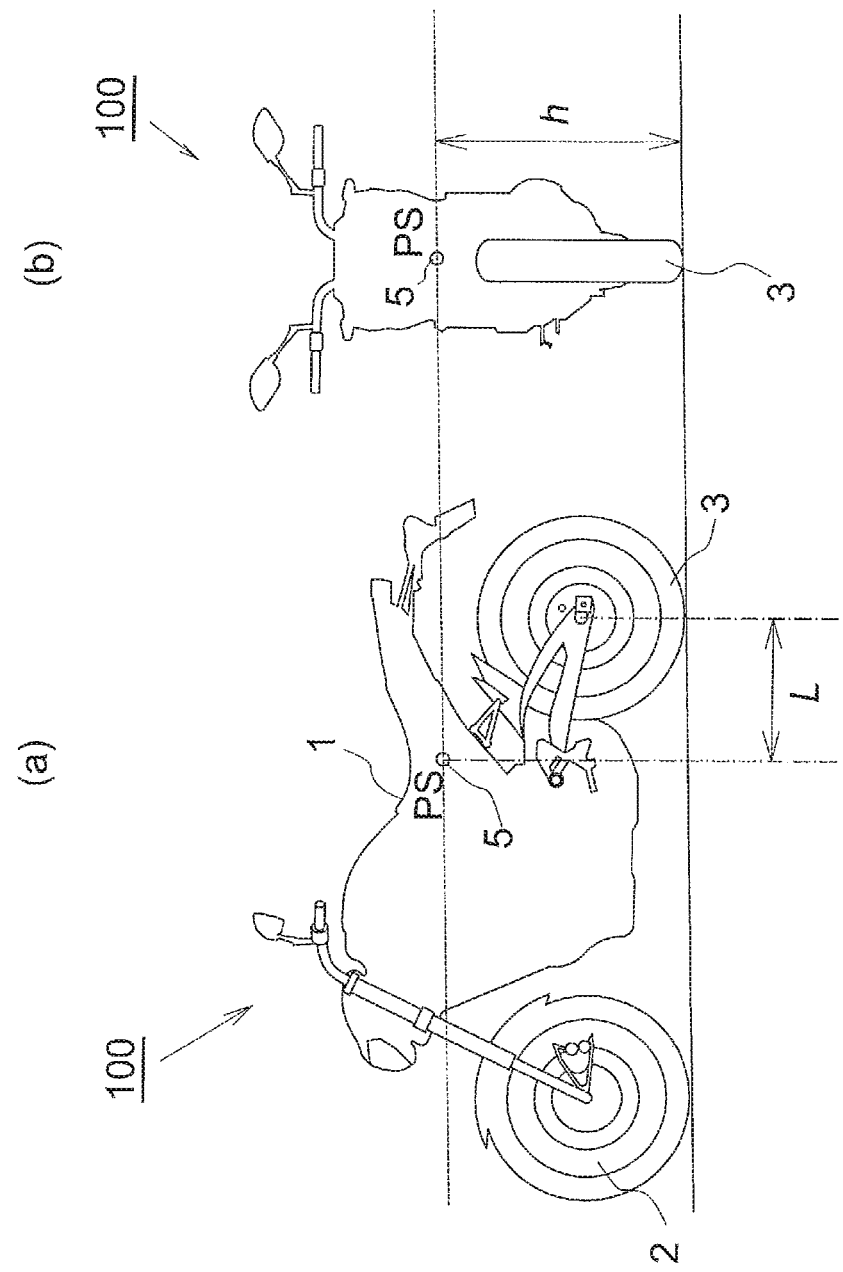
FIG. 6 illustrates where the group of sensors are mounted.
Figure 7:
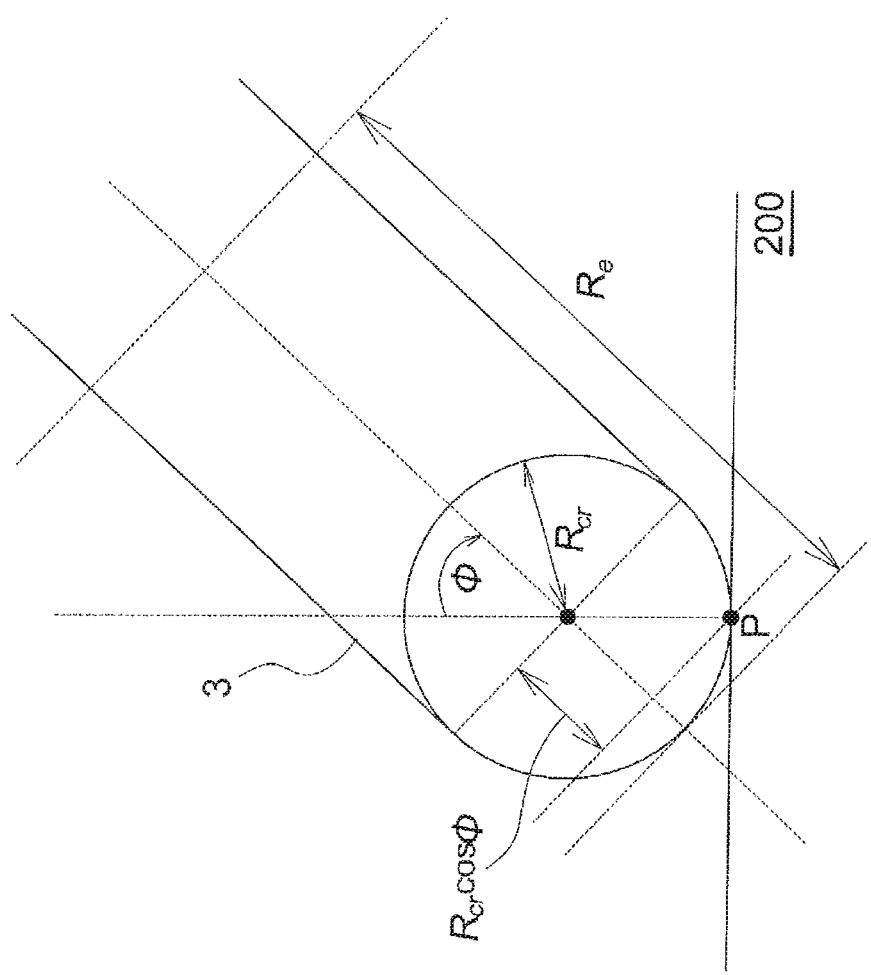
FIG. 7 is a schematic cross-sectional view of the rear wheel.
Figure 8:
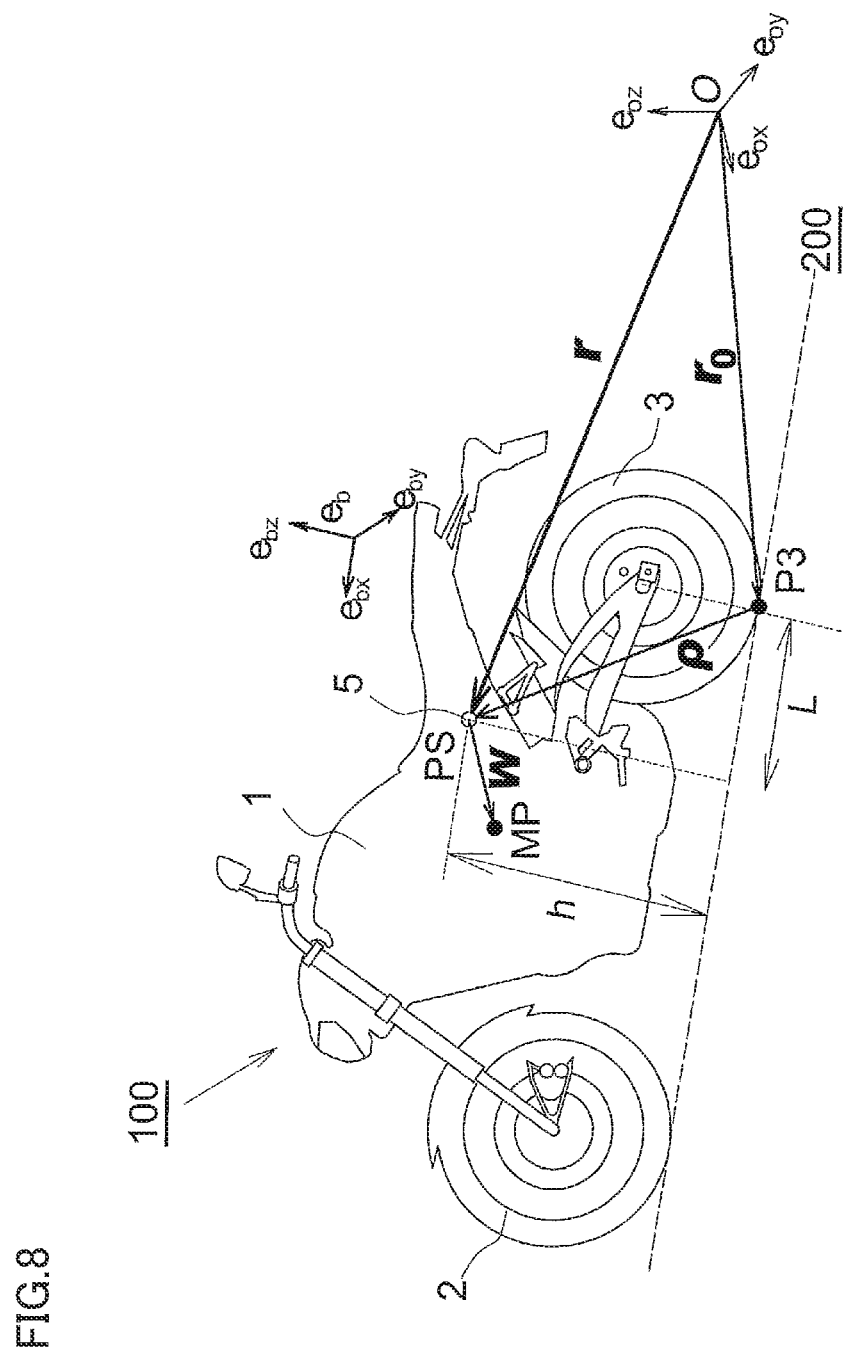
FIG. 8 illustrates where the group of sensors are mounted by means of vectors.

FIG. 6 illustrates where the group of sensors 5 are mounted. In FIG. 6, (a) shows the left side of the vehicle 100 while (b) shows the front of the vehicle 100. FIG. 7 is a schematic cross-sectional view of the rear wheel 3. FIG. 8 illustrates where the group of sensors 5 are mounted by means of vectors.

In FIG. 6, the position at which the group of sensors 5 are mounted is denoted by PS. The horizontal distance between the mounting position PS and the center of the rear wheel 3 is denoted by L, and the height of the mounting position PS relative to the road surface 200 is denoted by h.

The positional vector of the mounting position PS for the group of sensors 5 relative to the origin O of the inertia coordinate system, the positional vector of the grounding point P3 of the rear wheel 3 relative to the origin O of the inertia coordinate system, the vector from the grounding point P3 of the rear wheel 3 to the mounting position PS for the group of sensors 5, and the second-order differential vectors of various vectors will be denoted by the following characters. The two dots on top of the character indicating a parameter means second-order temporal differential.

TABLE 4

| Parameter | Meaning |
| --- | --- |
| r | positional vector of mounting position PS for group of sensors 5 |
| $\ddot{r}$ | second-order differential vector of positional vector r |
| $r_0$ | positional vector of grounding point P |
| $\ddot{r}_0$ | second-order differential vector of positional vector $r_0$ |
| $\rho$ | vector from grounding point P to mounting position PS of group of sensors 5 |
| $\ddot{\rho}$ | second-order differential vector of vector $\rho$ |

This gives Equation (2) below.

[Formula 3]

$$r = r_0 + \rho \quad (2)$$

Gravity acceleration vector and acceleration vector detected at the mounting position PS will be denoted by the following characters. The acceleration vector G is detected by the top-bottom acceleration sensor 24, front-rear acceleration sensor 25 and left-right acceleration sensor 26 provided at the mounting position PS.

TABLE 5

| Parameter | Meaning |
| --- | --- |
| g | gravity acceleration vector |
| G | acceleration vector at mounting position PS for group of sensors 5 |

The acceleration vector G is obtained by Equation (3) below.

[Formula 4]

$$G = \ddot{r} + g = \ddot{r}_0 + \ddot{\rho} + g \quad (3)$$

The right side of Equation (3) will be calculated below. The vector p shown in FIG. 8 is expressed by the following equation.

[Formula 5]

$$\rho = [e_b]\rho = [e_{bx}, e_{by}, e_{bz}]\rho \quad (4)$$

As discussed above, the vector $e_b$ is the basis vector of the vehicle coordinate system, where $e_{bx}$ corresponds to the component in the forward direction with respect to the vehicle body 1, $e_{by}$ corresponds to the component in the left direction with respect to the vehicle body 1, and $e_{bz}$ corresponds to the component in the upward direction with respect to the vehicle body 1. Based on FIGS. 6 and 7, the matrix p shown in the right side of Equation (4) is expressed by the equation below. In FIG. 7, the radius of a cross section of the rear wheel 3 is denoted by $R_{cr}$, and the radius of the rear wheel 3 is denoted by $R_e$. As discussed above, the roll angle of the vehicle body 1 is denoted by $\varphi$.

[Formula 6]

$$\rho = \begin{bmatrix} L \\ R_{cr} \sin \phi \\ h - R_{cr}(1 - \cos \phi) \end{bmatrix} \quad (5)$$

When movements of the suspension of the vehicle 100 are considered, to speak exactly, L and h vary; however, such variances are sufficiently small compared with the values of L and h, and thus the values of L and h can be considered approximately constant.

From Equation (5) provided above, the second-order differential vector of the vector p can be expressed by the following equation.

[Formula 7]

$$\ddot{p} = [e_b] \begin{bmatrix} a_x(\omega_{ro}, \omega_{ya}, \omega_{pi}, \dot{\omega}_{ro}, \dot{\omega}_{ya}, \dot{\omega}_{pi}, \phi, L, h, R_{cr}) \\ a_y(\omega_{ro}, \omega_{ya}, \omega_{pi}, \dot{\omega}_{ro}, \dot{\omega}_{ya}, \dot{\omega}_{pi}, \phi, L, h, R_{cr}) \\ a_z(\omega_{ro}, \omega_{ya}, \omega_{pi}, \dot{\omega}_{ro}, \dot{\omega}_{ya}, \dot{\omega}_{pi}, \phi, L, h, R_{cr}) \end{bmatrix} \quad (6)$$

In Equation (6), $a_x$, $a_y$ and $a_z$ are functions. The functions $a_x$, $a_y$ and $a_z$ can be determined by calculating Equations (4) and (5). Using Equation (1) provided above to rearrange Equation (5) into Equation (6) removes the differential value of the roll angle $\varphi$, the differential value of the yaw angle $\psi$ and the differential value of the pitch angle $\theta$.

Next, the side-skid velocity of the vehicle 100 is denoted by $V_y$. The first-order differential vector of the positional vector $r_0$ in FIG. 8 is expressed by the following equation using the vehicle velocity $V_x$ and side-skid velocity $V_y$. As discussed above, the vector $e_b$ is the basis vector of the vehicle coordinate system. According to the present embodiment, the elevation/depression angle caused by the slope of the road surface 200 and the stroke of the suspension are also taken into consideration for estimation, and thus the velocity $V_z$ for the z-direction of the vehicle 100 is generated. That is, the first-order differential vector of the positional vector $r_0$ in FIG. 8 is expressed by the following equation using $V_x$, $V_y$ and $V_z$.

[Formula 8]

$$\dot{r}_0 = [e_b] \begin{bmatrix} V_x \\ V_y \\ V_z \end{bmatrix} \quad (7)$$

From supposition (b), $V_y=0$; when Equation (7) is first-order differentiated, the second-order differential vector of the positional vector r is expressed by the equation provided below.

[Formula 9]

$$\ddot{r}_0 = [e_b] \begin{bmatrix} \dot{V}_x + V_z \omega_{pi} \\ V_x \omega_{ya} - V_z \omega_{ro} \\ \dot{V}_z - V_x \omega_{pi} \end{bmatrix} \quad (8)$$

As discussed above, the elevation/depression angle $\zeta$ is the angle formed by the x-axis of the vehicle coordinate system $e_b$ and the x-axis of the road-surface coordinate system $e_r$. This definition gives the following equation (9).

[Formula 10]

$$V_z = V_x \tan \zeta \quad (9)$$

Thus, Equation (8) may be rewritten into the following equation, Equation (10).

[Formula 11]

$$\ddot{r}_0 = [e_b] \begin{bmatrix} \dot{V}_x + V_x \omega_{pi} \tan \zeta \\ V_x(\omega_{ya} - \omega_{ro} \tan \zeta) \\ \dot{V}_x \tan \zeta + V_x(\dot{\zeta} \sec^2 \zeta - \omega_{pi}) \end{bmatrix} \quad (10)$$

Next, the gravity acceleration vector may be expressed by the equation below. g in the right side of Equation (11) below indicates the magnitude of the gravity acceleration.

[Formula 12]

$$g = [e_b] \begin{bmatrix} -g \sin \theta \\ g \cos \theta \sin \phi \\ g \cos \theta \cos \phi \end{bmatrix} \quad (11)$$

Based on Equations (3), (6), (10) and (11), the acceleration vector G detected at the mounting position PS may be expressed by the following equation.

[Formula 13]

$$G = \ddot{r} + g = \ddot{r}_0 + \ddot{p} + g = [e_b] \begin{bmatrix} \dot{V}_x + V_x \omega_{pi} \tan \zeta + a_x(\omega_{ro}, \omega_{ya}, \omega_{pi}, \dot{\omega}_{ro}, \dot{\omega}_{ya}, \dot{\omega}_{pi}, \phi, L, h, R_{cr}) - g \sin \theta \\ V_x(\omega_{ya} - \omega_{ro} \tan \zeta) + a_y(\omega_{ro}, \omega_{ya}, \omega_{pi}, \dot{\omega}_{ro}, \dot{\omega}_{ya}, \dot{\omega}_{pi}, \phi, L, h, R_{cr}) + g \cos \theta \sin \phi \\ \dot{V}_x \tan \zeta + V_x(\dot{\zeta} \sec^2 \zeta - \omega_{pi}) + a_z(\omega_{ro}, \omega_{ya}, \omega_{pi}, \dot{\omega}_{ro}, \dot{\omega}_{ya}, \dot{\omega}_{pi}, \phi, L, h, R_{cr}) + g \cos \theta \cos \phi \end{bmatrix} \quad (12)$$

The acceleration vector G detected at the mounting position PS may be expressed by the following equation using the front-rear acceleration $G_x$ detected by the front-rear acceleration sensor 25, the left-right acceleration $G_y$ detected by the left-right acceleration sensor 26, and the top-bottom acceleration $G_z$ detected by the top-bottom acceleration sensor 24.

[Formula 14]

$$G = [e_b] \begin{bmatrix} G_x \\ G_y \\ G_z \end{bmatrix} \quad (13)$$

Thus, based on Equations (12) and (13), the front-rear acceleration $G_x$, the left-right acceleration $G_y$, and the top-bottom acceleration $G_z$ may be expressed by the following equation.

[Formula 15]

$$\begin{bmatrix} G_x \\ G_y \\ G_z \end{bmatrix} = \begin{bmatrix} \dot{V}_x + V_x \omega_{pi} \tan \zeta + a_x(\omega_{ro}, \omega_{ya}, \omega_{pi}, \dot{\omega}_{ro}, \dot{\omega}_{ya}, \dot{\omega}_{pi}, \phi, L, h, R_{cr}) - g \sin \theta \\ V_x(\omega_{ya} - \omega_{ro} \tan \zeta) + a_y(\omega_{ro}, \omega_{ya}, \omega_{pi}, \dot{\omega}_{ro}, \dot{\omega}_{ya}, \dot{\omega}_{pi}, \phi, L, h, R_{cr}) + g \cos \theta \sin \phi \\ \dot{V}_x \tan \zeta + V_x(\dot{\zeta} \sec^2 \zeta - \omega_{pi}) + a_z(\omega_{ro}, \omega_{ya}, \omega_{pi}, \dot{\omega}_{ro}, \dot{\omega}_{ya}, \dot{\omega}_{pi}, \phi, L, h, R_{cr}) + g \cos \theta \cos \phi \end{bmatrix} \quad (14)$$

Next, the relationship between the rear-wheel velocity $v_r$ and vehicle velocity $V_x$ is determined. Supposition (a) means that there is no slide between the rear wheel 3 and road surface 200, and thus the relationship expressed by the following equation can be established between the rear-wheel velocity $v_r$ and vehicle velocity $V_x$.

[Formula 16]

$$\frac{V_x \sec \zeta}{R_e - R_{cr}(1 - \cos \phi)} = \frac{v_r}{R_e} \quad (15)$$

Equation (15) gives the following equation.

[Formula 17]

$$v_r = \frac{R_e \sec \zeta}{R_e - R_{cr}(1 - \cos \phi)} V_x = \frac{\sec \zeta}{1 - R_{cr}/R_e(1 - \cos \phi)} V_x \quad (16)$$

Equations (1), (14) and (16) give the following equation.

[Formula 18]

$$\frac{d}{dt}\begin{bmatrix} \phi \\ \theta \\ V_x \end{bmatrix} = \begin{bmatrix} \omega_{pi} \cos \phi - \omega_{ya} \sin \phi \\ \omega_{ro} + \omega_{pi} \tan \theta \sin \phi + \omega_{ya} \tan \theta \cos \phi \\ G_x - V_x \omega_{pi} \tan \zeta - a_x(\omega_{ro}, \omega_{ya}, \omega_{pi}, \dot{\omega}_{ro}, \dot{\omega}_{ya}, \dot{\omega}_{pi}, \phi, L, h, R_{cr}) + g \sin \theta \end{bmatrix} \quad (17)$$

As shown in FIG. 8, the vector from the mounting position PS for the group of sensors 5 to the gravity point MP of the main body of the vehicle body 1 is denoted by W. The gravity point MP does not take account of the weight of those portions of the vehicle body 1 that are located below the spring. The vector W is expressed by the following equation. The weight of the portions of the vehicle body 1 that are located below the spring include, for example, the weight of the tires 2 and 3.

[Formula 19]

$$W = [e_b] \begin{bmatrix} W_x \\ W_y \\ W_z \end{bmatrix} \quad (18)$$

Since the weight of the vehicle body 1 is generally distributed symmetrically with respect to the vertical centerline, $W_y = 0$. If the mass of the main body of the vehicle body 1 is denoted by M and the inertia moment tensor is denoted by I, the angular momentum vector L of the vehicle 100 as viewed from the reference point O is calculated in the manner described below. In the following vector calculation equation, "·" means an inner product and "×" means an outer product.

[Formula 20]

$$L = M(r+W) \times \frac{d}{dt}(r+W) + I \cdot \omega \quad (19)$$
$$= M(r+W) \times \left(\frac{d}{dt}r + \frac{d}{dt}W\right) + I \cdot \omega$$

In Equation (19), the angular velocity vector ω and tensor I are defined by the following equations.

[Formula 21]

$$\omega = [e_b] \begin{bmatrix} \omega_{ro} \\ \omega_{pi} \\ \omega_{ya} \end{bmatrix} \quad (20)$$

[Formula 22]

$$I = I_{xx}(e_{bx} \otimes e_{bx}) + I_{xy}(e_{bx} \otimes e_{by}) + I_{xz}(e_{bx} \otimes e_{bz}) \quad (21)$$
$$I_{xy}(e_{by} \otimes e_{bx}) + I_{yy}(e_{by} \otimes e_{by}) + I_{yz}(e_{by} \otimes e_{bz})$$
$$I_{xz}(e_{bz} \otimes e_{bx}) + I_{yz}(e_{bz} \otimes e_{by}) + I_{zz}(e_{bz} \otimes e_{bz})$$

In Equation (21), an operator with a circle including a cross means a "tensor product".

Temporally differentiating both sides of Equation (19) gives the following equation.

[Formula 23]

$$\dot{L} = M(\dot{r}+\dot{W}) \times (\dot{r}+\dot{W}) + M(r+W) \times (\ddot{r}+\ddot{W}) + I \cdot \dot{\omega} \quad (22)$$
$$= M(r+W) \times (\ddot{r}+\ddot{W}) + I \cdot \dot{\omega}$$
$$= M(r_0+\rho+W) \times (\ddot{r}_0+\ddot{\rho}+\ddot{W}) + I \cdot \dot{\omega}$$
$$= r_0 \times M(\ddot{r}_0+\ddot{\rho}+\ddot{W}) + M(\rho+W) \times (\ddot{r}_0+\ddot{\rho}+\ddot{W}) + I \cdot \dot{\omega}$$

If it is rearranged in a manner similar to that for the rearrangement of Equation (5) into Equation (6), the second-order differential vector of the vector W and the inner product of the tensor I and angular acceleration vector ω dot (first-order differential vector of the angular velocity vector ω) are expressed by the following equations.

[Formula 24]

$$\ddot{W} = [e_b] \begin{bmatrix} w_x(\omega_{ro}, \omega_{ya}, \omega_{pi}, \dot{\omega}_{ro}, \dot{\omega}_{ya}, \dot{\omega}_{pi}, W_x, W_z) \\ w_y(\omega_{ro}, \omega_{ya}, \omega_{pi}, \dot{\omega}_{ro}, \dot{\omega}_{ya}, \dot{\omega}_{pi}, W_x, W_z) \\ w_z(\omega_{ro}, \omega_{ya}, \omega_{pi}, \dot{\omega}_{ro}, \dot{\omega}_{ya}, \dot{\omega}_{pi}, W_x, W_z) \end{bmatrix} \quad (23)$$

[Formula 25]

$$I \cdot \dot{\omega} = [e_b] \begin{bmatrix} q_x(\omega_{ro}, \omega_{ya}, \omega_{pi}, \dot{\omega}_{ro}, \dot{\omega}_{ya}, \dot{\omega}_{pi}, I_{xx}, I_{yy}, I_{zz}, I_{xz}) \\ q_y(\omega_{ro}, \omega_{ya}, \omega_{pi}, \dot{\omega}_{ro}, \dot{\omega}_{ya}, \dot{\omega}_{pi}, I_{xx}, I_{yy}, I_{zz}, I_{xz}) \\ q_z(\omega_{ro}, \omega_{ya}, \omega_{pi}, \dot{\omega}_{ro}, \dot{\omega}_{ya}, \dot{\omega}_{pi}, I_{xx}, I_{yy}, I_{zz}, I_{xz}) \end{bmatrix} \quad (24)$$

$w_x$, $w_y$ and $w_z$ in Equation (23) and $q_x$, $q_y$ and $q_z$ in Equation (24) are functions. These functions may be calculated by a rearrangement similar to the rearrangement of Equation (5) to Equation (6).

Figure 9:
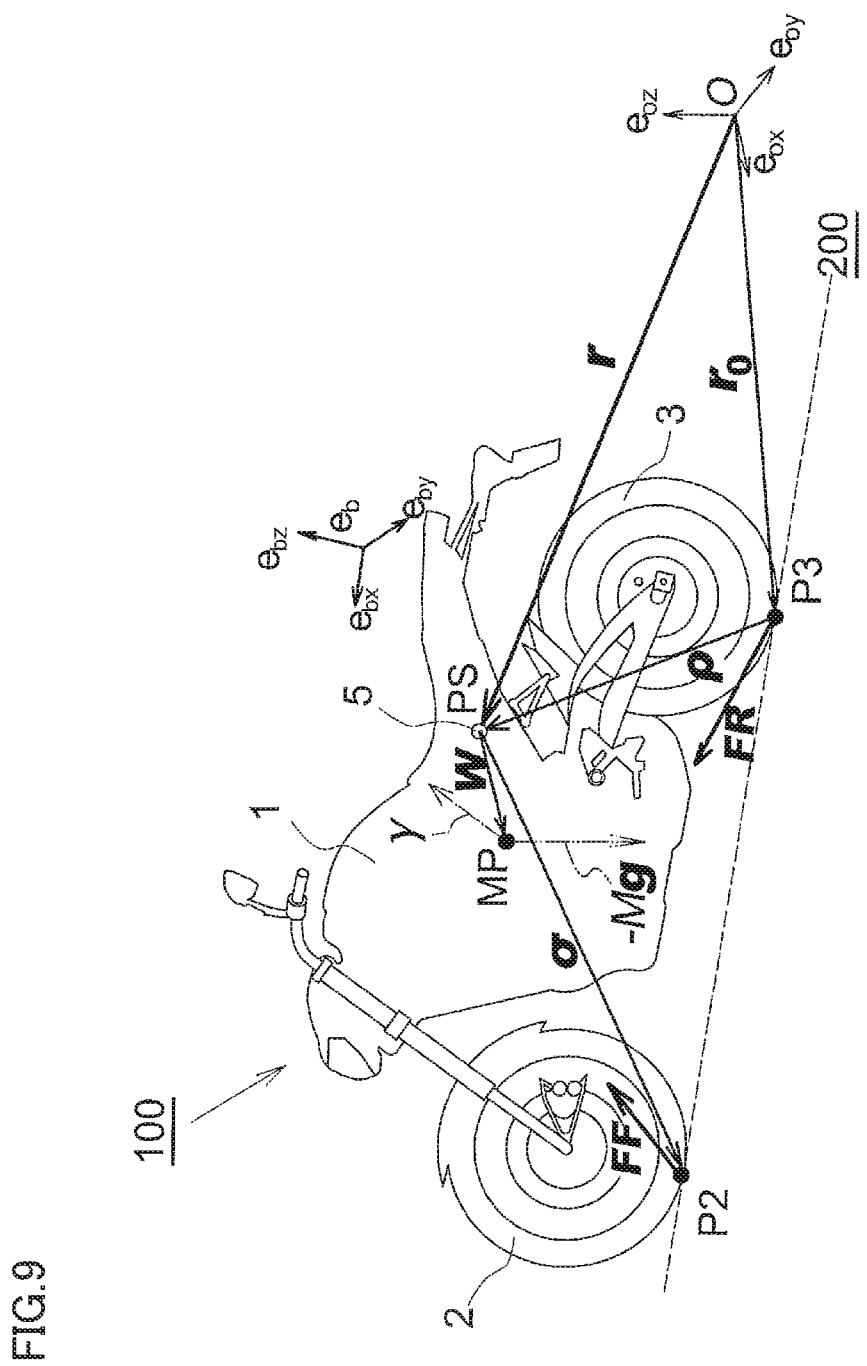
FIG. 9 illustrates the vectors of forces acting on the road-surface grounding points for the front and rear wheels.

Next, the moments of forces acting on the vehicle 100 as viewed from the reference point O are calculated. As shown in FIG. 9, forces acting on the vehicle 100 include the gravity vector —Mg, the aerodynamic vector γ composed of the air resistance, lift force etc., the force vector FF acting on the road-surface grounding point P2 for the front wheel 2, and the force vector FR acting on the road-surface grounding point P3 for the rear wheel 3. The force vector FF acting on the road-surface grounding point P2 for the front wheel 2 and the force vector FR acting on the road-surface grounding point P3 for the rear wheel 3 are expressed by the following equations.

[Formula 26]

$$FF = [e_b] \begin{bmatrix} FF_x \\ FF_y \\ FF_z \end{bmatrix} \quad FR = [e_b] \begin{bmatrix} FR_x \\ FR_y \\ FR_z \end{bmatrix} \quad (25)$$

The force of gravity and the aerodynamic force act on the gravity point MP of the vehicle 100. The aerodynamic vector γ is expressed by the following equation.

[Formula 27]

$$\gamma = [e_b] \begin{bmatrix} \gamma_x \\ \gamma_y \\ \gamma_z \end{bmatrix} \quad (26)$$

The aerodynamic force depends on the velocity V and angular velocity ω of the vehicle 100, and thus may be expressed by the following equation.

[Formula 28]

$$\begin{bmatrix} \gamma_x \\ \gamma_y \\ \gamma_z \end{bmatrix} = \begin{bmatrix} \gamma_x(V_x, V_y, V_z, \omega_{ro}, \omega_{ya}, \omega_{pi}) \\ \gamma_y(V_x, V_y, V_z, \omega_{ro}, \omega_{ya}, \omega_{pi}) \\ \gamma_z(V_x, V_y, V_z, \omega_{ro}, \omega_{ya}, \omega_{pi}) \end{bmatrix} = \begin{bmatrix} \gamma_x(\omega_{ro}, \omega_{ya}, \omega_{pi}, \zeta, V_x) \\ \gamma_y(\omega_{ro}, \omega_{ya}, \omega_{pi}, \zeta, V_x) \\ \gamma_z(\omega_{ro}, \omega_{ya}, \omega_{pi}, \zeta, V_x) \end{bmatrix} \quad (27)$$

In Equation (27), the rearrangement is done using $V_y=0$, which is based on supposition (b), and Equation (9).

As shown in FIG. 9, if the vector from the mounting position PS for the group of sensors 5 to the road-surface grounding point P2 for the front wheel 2 is denoted by σ, the vector σ is expressed by the equation provided below. In the following equation, the horizontal distance from the mounting position PS to the center of the front wheel 2 is denoted by L'.

[Formula 29]

$$\sigma = [e_b] \begin{bmatrix} L' \\ -R_{cr} \sin \phi \\ -h + R_{cr}(1 - \cos \phi) \end{bmatrix} \quad (28)$$

The moment vector N of the force acting on the vehicle 100 as viewed from the reference point O is expressed by the following equation.

[Formula 30]

$$\begin{aligned} N &= (r+W) \times (-Mg+\gamma) + (\gamma+\sigma) \times FF + r_0 \times FR \\ &= (r_0+\rho+W) \times (-Mg+\gamma) + (r_0+\rho+W) \times F + r_0 \times FR \\ &= r_0 \times (-Mg+\gamma+FF+FR) + (\rho+W) \times \\ &\quad (-Mg+\gamma) + (\rho+\sigma) \times FF \end{aligned} \quad (29)$$

The quantity of the first-order differential of the angular momentum vector L of the vehicle 100 as viewed from the reference point O is the same as the moment vector N of the force acting on the vehicle 100 as viewed from the reference point O. That is, the following equation is established.

[Formula 31]

$$\dot{L} \equiv \frac{dL}{dt} = N \quad (30)$$

Equation (30) should be true regardless of where the reference point is located. That is, Equation (30) should be true for any positional vector r. Thus, if Equations (22) and (29) are identical equations, the following two equations are established.

[Formula 32]

$$M(\ddot{r}_0+\ddot{\rho}+\ddot{W})=-Mg+\gamma+FF+FR \quad (31)$$

[Formula 33]

$$M(\rho+W)\times(\ddot{r}_0+\ddot{\rho}+\ddot{W})+I\cdot\dot{\omega}=(\rho W)\times(-Mg+\gamma)+(\rho+\sigma)\times FF \quad (32)$$

Equation (31) may be rearranged into Equation (33) below.

[Formula 34]

$$FF+FR=M(\ddot{r}_0+\ddot{\rho}+g+\ddot{W})-\gamma \quad (33)$$

Expressing Equation (33) using entries gives Equation (34) below.

[Formula 35]

$$FF + FR = M [e_b] \begin{bmatrix} \dot{V}_x + V_x \omega_{pi} \tan \zeta + a_x(\omega_{ro}, \omega_{ya}, \omega_{pi}, \dot{\omega}_{ro}, \dot{\omega}_{ya}, \dot{\omega}_{pi}, \phi, L, h, R_{cr}) - g \sin \theta \\ V_x(\omega_{ya} - \omega_{ro} \tan \zeta) + a_y(\omega_{ro}, \omega_{ya}, \omega_{pi}, \dot{\omega}_{ro}, \dot{\omega}_{ya}, \dot{\omega}_{pi}, \phi, L, h, R_{cr}) + g \cos \theta \sin \phi \\ \dot{V}_x \tan \zeta + V_x(\dot{\zeta} \sec^2 \zeta - \omega_{pi}) + a_z(\omega_{ro}, \omega_{ya}, \omega_{pi}, \dot{\omega}_{ro}, \dot{\omega}_{ya}, \dot{\omega}_{pi}, \phi, L, h, R_{cr}) + g \cos \theta \cos \phi \end{bmatrix} +$$

$$[e_b] \begin{bmatrix} Mw_x(\omega_{ro}, \omega_{ya}, \omega_{pi}, \dot{\omega}_{ro}, \dot{\omega}_{ya}, \dot{\omega}_{pi}, W_x, W_z) \\ Mw_y(\omega_{ro}, \omega_{ya}, \omega_{pi}, \dot{\omega}_{ro}, \dot{\omega}_{ya}, \dot{\omega}_{pi}, W_x, W_z) \\ Mw_z(\omega_{ro}, \omega_{ya}, \omega_{pi}, \dot{\omega}_{ro}, \dot{\omega}_{ya}, \dot{\omega}_{pi}, W_x, W_z) \end{bmatrix} - [e_b] \begin{bmatrix} \gamma_x(\omega_{ro}, \omega_{ya}, \omega_{pi}, \zeta, V_x) \\ \gamma_y(\omega_{ro}, \omega_{ya}, \omega_{pi}, \zeta, V_x) \\ \gamma_z(\omega_{ro}, \omega_{ya}, \omega_{pi}, \zeta, V_x) \end{bmatrix} \quad (34)$$

Based on the relational expression for the first entry of Equation (14) provided above, the following equation may be found.

[Formula 36]

$$\dot{V}_x = A_x(\omega_{ro}, \omega_{ya}, \omega_{pi}, \dot{\omega}_{ro}, \dot{\omega}_{ya}, \dot{\omega}_{pi}, G_x, \theta, \phi, V_x, \zeta, L, h, R_{cr}, g) \quad (35)$$

Using Equation (35), Equation (34) may be rewritten into the following equation.

[Formula 37]

$$FF + FR = [e_b] \begin{bmatrix} F_x(\omega_{ro}, \omega_{ya}, \omega_{pi}, \dot{\omega}_{ro}, \dot{\omega}_{ya}, \dot{\omega}_{pi}, G_x, \zeta, \theta, \phi, V_x, L, h, R_{cr}, g, W_x, W_z) \\ F_y(\omega_{ro}, \omega_{ya}, \omega_{pi}, \dot{\omega}_{ro}, \dot{\omega}_{ya}, \dot{\omega}_{pi}, \zeta, \theta, \phi, V_x, L, h, R_{cr}, g, W_x, W_z) \\ F_z(\omega_{ro}, \omega_{ya}, \omega_{pi}, \dot{\omega}_{ro}, \dot{\omega}_{ya}, \dot{\omega}_{pi}, G_x, \zeta, \dot\zeta, \theta, \phi, V_x, L, h, R_{cr}, g, W_x, W_z) \end{bmatrix} \quad (36)$$

Using Equation (32), Equation (31) may be rearranged into the following equation.

[Formula 38]

$$I \cdot \dot{\omega} = -(\rho + W) \times (FF + FR) + (\rho + \sigma) \times FF \quad (37)$$
$$= (\sigma - W) \times FF - (\rho + W) \times FR$$

$$\sigma - W = [e_b] \begin{bmatrix} L' - W_x \\ -R_{cr} \sin \phi \\ -h + R_{cr}(1 - \cos \phi) - W_z \end{bmatrix} \quad (38)$$

$$-(\rho + W) = [e_b] \begin{bmatrix} -L - W_x \\ -R_{cr} \sin \phi \\ -h + R_{cr}(1 - \cos \phi) - W_z \end{bmatrix} \quad (39)$$

Expressing Equation (37) using entries gives the following equation, Equation (40).

[Formula 39]

$$I \cdot \dot\omega = [e_b] \begin{bmatrix} -(FF_y + FR_y)\{R_{cr}(1 - \cos \phi) - h - W_z\} - (FF_z + FR_z)R_{cr} \sin \phi \\ (FF_x + FR_x)\{R_{cr}(1 - \cos \phi) - h - W_z\} + (FF_z + FR_z)W_x - L'FF_z + LFR_z \\ (FF_x + FR_x)R_{cr} \sin \phi - (FF_y + FR_y)W_x + L'FF_y - LFR_y \end{bmatrix} \quad (40)$$

Substituting the second and third entries of Equation (36) for the first entry of Equation (40) removes $FF_y$, $FR_y$, $FF_z$ and $FR_z$. That is, Equation (41) below is given.

[Formula 40]

$$q_x(\omega_{ro}, \omega_{ya}, \omega_{pi}, \dot{\omega}_{ro}, \dot{\omega}_{ya}, \dot{\omega}_{pi}, I_{xx}, I_{yy}, I_{zz}, I_{xz}) = \quad (41)$$
$$-F_y(\omega_{ro}, \omega_{ya}, \omega_{pi}, \dot{\omega}_{ro}, \dot{\omega}_{ya}, \dot{\omega}_{pi}, \zeta, \theta, \phi, V_x, L, h, R_{cr}, g, W_x, W_z)$$
$$\{R_{cr}(1 - \cos \phi) - h - W_z\} - F_z(\omega_{ro}, \omega_{ya}, \omega_{pi}, \dot{\omega}_{ro}, \dot{\omega}_{ya},$$
$$\dot{\omega}_{pi}, G_x, \zeta, \dot\zeta, \theta, \phi, V_x, L, h, R_{cr}, g, W_x, W_z) R_{cr} \sin \phi$$

Equation (41) may be described by the following equation.

[Formula 41]

$$0 = Q_x(\omega_{ro}, \omega_{ya}, \omega_{pi}, \dot{\omega}_{ro}, \dot{\omega}_{ya}, \dot{\omega}_{pi}, G_x, \zeta, \dot\zeta, \theta, \phi, V_x, L, h, R_{cr}, g, W_x, W_z, I_{xx}, I_{yy}, I_{zz}, I_{xz}) \quad (42)$$

The factors of the function $Q_x$ of Equation (42) are all numbers that can be uniquely derived from the vehicle data, for example, except the values provided by the group of sensors 5 and the values estimated by the attitude estimation apparatus 10. That is, Equation (42) means that the function $Q_x$, indicating a constant, necessarily exists regardless of time. An equation satisfying this function "$Q_x$=constant" corresponds to the "characteristic equation".

Based on Equation (35), Equation (17) may be rewritten into the following equation.

[Formula 42]

$$\frac{d}{dt} \begin{bmatrix} \phi \\ \theta \\ V_x \end{bmatrix} = \quad (43)$$

$$\begin{bmatrix} \dot\theta(\omega_{pi}, \omega_{ya}, \theta) \\ \dot\phi(\omega_{ro}, \omega_{pi}, \omega_{ya}, \theta, \phi) \\ A_x(\omega_{ro}, \omega_{ya}, \omega_{pi}, \dot{\omega}_{ro}, \dot{\omega}_{ya}, \dot{\omega}_{pi}, G_x, \theta, \phi, V_x, \zeta, L, h, R_{cr}, g) \end{bmatrix}$$

Further, from Equations (14), (16) and (42), the following equation may be derived.

[Formula 43]

$$\begin{bmatrix} G_y \\ G_z \\ v_r \\ 0 \end{bmatrix} = \begin{bmatrix} A_y(\omega_{ro}, \omega_{ya}, \omega_{pi}, \dot{\omega}_{ro}, \dot{\omega}_{ya}, \dot{\omega}_{pi}, \zeta, \theta, \phi, V_x, L, h, R_{cr}, g) \\ A_z(\omega_{ro}, \omega_{ya}, \omega_{pi}, \dot{\omega}_{ro}, \dot{\omega}_{ya}, \dot{\omega}_{pi}, G_x, \zeta, \dot{\zeta}, \theta, \phi, V_x, L, h, R_{cr}, g) \\ \dfrac{\sec \zeta}{1 - R_{cr}/R_e(1 - \cos \phi)} V_x \\ Q_x(\omega_{ro}, \omega_{ya}, \omega_{pi}, \dot{\omega}_{ro}, \dot{\omega}_{ya}, \dot{\omega}_{pi}, G_x, \zeta, \dot{\zeta}, \theta, \phi, V_x, L, h, R_{cr}, g, W_x, W_z, I_{xx}, I_{yy}, I_{zz}, I_{xz}) \end{bmatrix} \quad (44)$$

The Kalman filter 50, at the system equation calculation unit 51, uses Equation (43) as the system equation to perform calculation, and, at the observation equation calculation unit 52, uses Equation (44) as the observation equation to perform calculation.

Further, even if the roll angular velocity offset $b_{ro}$, yaw angular velocity offset $b_{ya}$, pitch angular velocity offset $b_{pi}$ and top-bottom acceleration offset $b_z$ vary, such variances are slow compared with movements of the vehicle 100. Thus, the differential value of the roll angular velocity offset $b_{ro}$, the differential value of the yaw angular velocity offset $b_{ya}$, the differential value of the pitch angular velocity offset $b_{pi}$, and the differential value of the top-bottom acceleration offset $b_z$ can be considered to be zero.

Further, replacing some values in Equations (43) and (44) with values reflecting offset errors gives the following equations.

[Formula 44]

$$\dfrac{d}{dt}\begin{bmatrix} \phi \\ \theta \\ V_x \\ b_{ro} \\ b_{pi} \\ b_{ya} \\ b_z \end{bmatrix} = \begin{bmatrix} \dot{\theta}(\omega_{pi} - b_{pi}, \omega_{ya} - b_{ya}, \phi) \\ \dot{\phi}(\omega_{ro} - b_{ro}, \omega_{pi} - b_{pi}, \omega_{ya} - b_{ya}, \theta, \phi) \\ A_x(\omega_{ro} - b_{ro}, \omega_{ya} - b_{ya}, \omega_{pi} - b_{pi}, \dot{\omega}_{ro}, \dot{\omega}_{ya}, \dot{\omega}_{pi}, G_x, \theta, \phi, V_x, \zeta, L, h, R_{cr}, g) \\ 0 \\ 0 \\ 0 \\ 0 \end{bmatrix} \quad (45)$$

[Formula 45]

$$\begin{bmatrix} G_y \\ G_z \\ v_r \\ 0 \end{bmatrix} = \begin{bmatrix} A_y(\omega_{ro} - b_{ro}, \omega_{ya} - b_{ya}, \omega_{pi} - b_{pi}, \dot{\omega}_{ro}, \dot{\omega}_{ya}, \dot{\omega}_{pi}, \zeta, \theta, \phi, V_x, L, h, R_{cr}, g) \\ A_z(\omega_{ro} - b_{ro}, \omega_{ya} - b_{ya}, \omega_{pi} - b_{pi}, \dot{\omega}_{ro}, \dot{\omega}_{ya}, \dot{\omega}_{pi}, \zeta, \dot{\zeta}, \theta, \phi, V_x, L, h, R_{cr}, g) + b_z \\ \dfrac{\sec \zeta}{1 - R_{cr}/R_e(1 - \cos \phi)} V_x \\ Q_x(\omega_{ro} - b_{ro}, \omega_{ya} - b_{ya}, \omega_{pi} - b_{pi}, \dot{\omega}_{ro}, \dot{\omega}_{ya}, \dot{\omega}_{pi}, G_x, \zeta, \dot{\zeta}, \theta, \phi, V_x, L, h, R_{cr}, g, W_x, W_z, I_{xx}, I_{yy}, I_{zz}, I_{xz}) \end{bmatrix} \quad (46)$$

When taking account of the offset errors, the Kalman filter 50, at the system equation calculation unit 51, uses Equation (45) as the system equation to perform calculation, and, at the observation equation calculation unit 52, uses Equation (46) as the observation equation to perform calculation. Equations (45) and (46) take account of the roll angular velocity offset $b_{ro}$, yaw angular velocity offset $b_{ya}$, pitch angular velocity offset $b_{pi}$, and top-bottom acceleration offset $b_z$.

As the Kalman filter 50 uses Equation (45) as the system equation and uses Equation (46) as the observation equation to perform calculation, the roll angle $\varphi$, pitch angle $\theta$, vehicle velocity $V_x$, roll angular velocity offset $b_{ro}$, yaw angular velocity offset $b_{ya}$, pitch angular velocity offset $b_{pi}$, and top-bottom acceleration offset $b_z$ may be estimated. The right side of Equation (45) corresponds to the function f(x,u) and the right side of Equation (46) corresponds to the function h(x,u).

An angular velocity sensor is more likely to have an offset error than an acceleration sensor. In view of this, according to the present embodiment, the offset error for the roll angular velocity sensor 21 (roll angular velocity sensor offset $b_{ro}$), the offset error for the yaw angular velocity sensor 22 (yaw angular velocity sensor offset $b_{ya}$), and the offset error for the pitch angular velocity sensor 23 (pitch angular velocity offset $b_{pi}$) are estimated. Using the estimated values of the roll angular velocity offset $b_{ro}$, yaw angular velocity offset $b_{ya}$, and pitch angular velocity offset $b_{pi}$, in a subsequent estimation operation sufficiently improves the accuracy with which the roll angle $\varphi$ and pitch angle $\theta$ are estimated.

Further, if the offset errors of the three acceleration sensors (top-bottom acceleration sensor 24, front-rear acceleration sensor 25 and left-right acceleration sensor 26) can be estimated, the accuracy with which the roll angle φ and pitch angle θ are estimated is expected to further improve. However, if the offset errors for the three acceleration sensors are to be estimated, observability cannot be maintained. In view of this, according to the present embodiment, the offset error for the top-bottom acceleration sensor 24 (top-bottom acceleration sensor offset $b_z$) is estimated for the following reasons: When the roll angle φ of the vehicle body 1 is in a small range, the top-bottom acceleration of the vehicle body 1 does not change significantly. If the detected value of such top-bottom acceleration is changed by the top-bottom acceleration sensor offset $b_z$, a change in the detected value of top-bottom acceleration significantly affects estimation of the roll angle φ. Thus, using the estimated value of the top-bottom acceleration sensor offset $b_z$ in a subsequent estimation operation further improves the estimation accuracy found when the roll angle φ is in a small range.

Here, it is possible to arbitrarily select for which sensor the Kalman filter 50 of the present teaching has the function of estimating the offset error.

<Configuration of Load Estimation Unit>

Based on the results of the calculation at the Kalman filter 50, the load estimation unit 60 performs processing to estimate the load applied to at least one of the front wheel 2 and rear wheel 3 of the vehicle 100.

Equations (36) and (40) provided above will be shown again.

[Formula 46]

$$FF + FR = [e_b] \begin{bmatrix} F_x(\omega_{ro}, \omega_{ya}, \omega_{pi}, \dot{\omega}_{ro}, \dot{\omega}_{ya}, \dot{\omega}_{pi}, G_x, \zeta, \theta, \phi, V_x, L, h, R_{cr}, g, W_x, W_z) \\ F_y(\omega_{ro}, \omega_{ya}, \omega_{pi}, \dot{\omega}_{ro}, \dot{\omega}_{ya}, \dot{\omega}_{pi}, \zeta, \theta, \phi, V_x, L, h, R_{cr}, g, W_x, W_z) \\ F_z(\omega_{ro}, \omega_{ya}, \omega_{pi}, \dot{\omega}_{ro}, \dot{\omega}_{ya}, \dot{\omega}_{pi}, G_x, \zeta, \theta, \phi, V_x, L, h, R_{cr}, g, W_x, W_z) \end{bmatrix} \quad (36)$$

[Formula 47]

$$I \cdot \dot{\omega} = [e_b] \begin{bmatrix} -(FF_y + FR_y)\{R_{cr}(1 - \cos\phi) - h - W_z\} - (FF_z + FR_z)R_{cr}\sin\phi \\ (FF_x + FR_x)\{R_{cr}(1 - \cos\phi) - h - W_z\} + (FF_z + FR_z)W_x - L'FF_z + LFR_z \\ (FF_x + FR_x)R_{cr}\sin\phi - (FF_y + FR_y)W_x + L'FF_y - LFR_y \end{bmatrix} \quad (40)$$

Substituting the entries of Equation (36) for the second and third entries of Equation (40) gives the following equation, (47).

[Formula 48]

$$L'FF_y - LFR_y = E_y(\omega_{ro}, \omega_{ya}, \omega_{pi}, \dot{\omega}_{ro}, \dot{\omega}_{ya}, \dot{\omega}_{pi}, G_x, \zeta, \theta, \phi, V_x, L, h, R_{cr}, g, W_x, W_z, I_{xx}, I_{yy}, I_{zz}, I_{xz}) \quad (47)$$

$$L'FF_z - LFR_z = E_z(\omega_{ro}, \omega_{ya}, \omega_{pi}, \dot{\omega}_{ro}, \dot{\omega}_{ya}, \dot{\omega}_{pi}, G_x, \zeta, \theta, \phi, V_x, L, h, R_{cr}, g, W_x, W_z, I_{xx}, I_{yy}, I_{zz}, I_{xz}) \quad (48)$$

According to the present embodiment, the vehicle 100 is a motorcycle, and thus L+L'≠0. Then, based on the second and third entries of Equation (36) and Equations (47) and (48), a solution may be reached for $FF_y$, $FR_y$, $FF_z$ and $FR_z$. The force $FF_z$ of the front wheel 2 in the z-direction and the force $FR_z$ of the rear wheel 3 in the z-direction are calculated by the equations provided below. In the following equations, $J_F$ and $J_R$ are functions.

[Formula 49]

$$FF_z = J_F(\omega_{ro}, \omega_{ya}, \omega_{pi}, \dot{\omega}_{ro}, \dot{\omega}_{ya}, \dot{\omega}_{pi}, G_x, \zeta, \dot{\zeta}, \theta, \phi, V_x, L, L', h, R_{cr}, g, W_x, W_z, I_{xx}, I_{yy}, I_{zz}, I_{xz}) \quad (49)$$

$$FR_z = J_R(\omega_{ro}, \omega_{ya}, \omega_{pi}, \dot{\omega}_{ro}, \dot{\omega}_{ya}, \dot{\omega}_{pi}, G_x, \zeta, \dot{\zeta}, \theta, \phi, V_x, L, L', h, R_{cr}, g, W_x, W_z, I_{xx}, I_{yy}, I_{zz}, I_{xz}) \quad (50)$$

The load estimation unit 60 performs the calculation described above based on the result of the calculation at the Kalman filter 50 to calculate the force FF acting on the front wheel 2 and the force FR acting on the rear wheel 3.

<Configuration of Suspension Stroke Quantity Estimation Unit>

The suspension stroke quantity estimation unit 70 performs calculation based on the estimation results from the load estimation unit 60 to estimate the stroke quantity of the suspension provided on at least one of the front wheel 2 and rear wheel 3.

If the caster angle is denoted by $\varepsilon_F$, the force $F_f$ acting on the front fork 16 is calculated by $FF_z \cos \varepsilon_F - FF_x \sin \varepsilon_F$. The caster angle is the angle formed by the direction extending vertically upward from the grounding point P2 of the front wheel 3 and the front fork 16.

Figure 10:
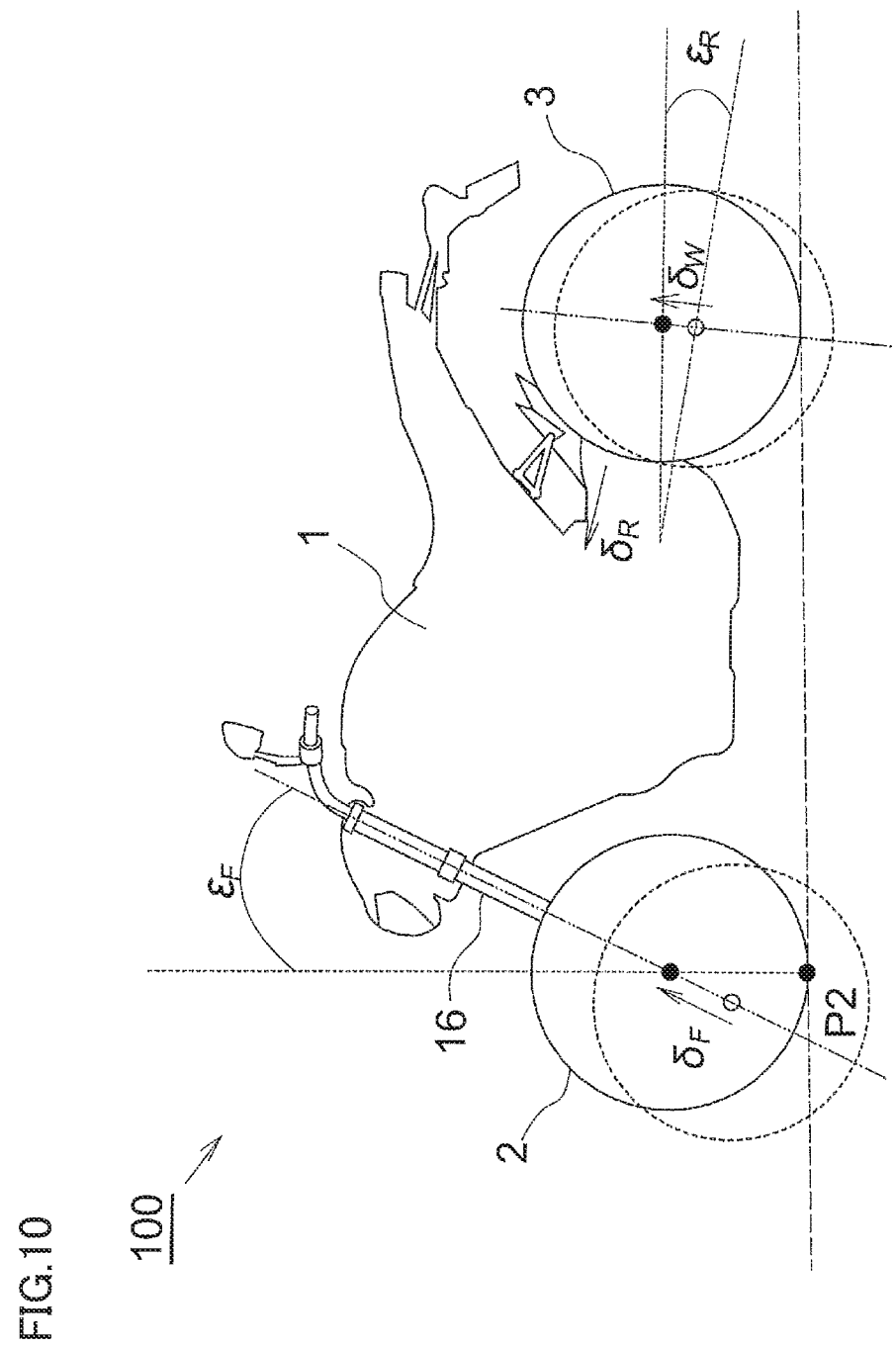
FIG. 10 illustrates the caster angle and the rear arm angle.

The stroke quantity of the shock absorber of the rear suspension is denoted by $\delta_R$, and the displacement of the center of the rear wheel 3 is denoted by $\delta_W$. The hang angle of the rear arm relative to the horizontal direction found when the stroke quantity of the shock absorber of the rear suspension is $\delta_R$ is denoted by $\varepsilon_R(\delta_R)$. The caster angle $\varepsilon_F$ and the rear arm angle $\varepsilon_R(\delta_W)$ are shown in FIG. 10.

Then, the force $F_1$ acting on the suspension is expressed by the following equation.

[Formula 50]

$$F_1 = (FR_z \cos \epsilon_R - FR_x \sin \epsilon_R)\frac{d\delta_W}{d\delta_R} \quad (51)$$

$$\equiv (FR_z \cos \epsilon_R - FR_x \sin \epsilon_R) \kappa(\delta_R)$$

Figure 11:
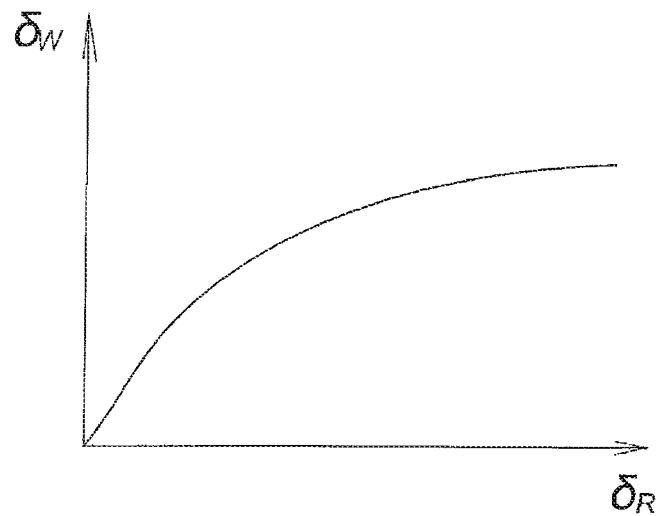
FIG. 11 is a graph schematically illustrating an exemplary relationship between $\delta_R$ and $\delta_W$.

In Equation (51), $\kappa$ is data called lever ratio which may be calculated from design drawings. FIG. 11 schematically shows an example of the relationship between $\delta_R$ and $\delta_W$.

The suspension stroke quantity estimation unit 70 performs the following estimation processing.

[Formula 51]

For $FFx + FRx \geq 0$ (during acceleration)

$$FF_x \to FF'_x = 0 \quad (52)$$
$$FR_x \to FR'_x = FF_x + FR_x$$

For $FFx + FRx < 0$ (during deceleration)

$$FF_x \to FF'_x = \frac{FF_z}{FF_z + FR_z}(FF_x + FR_x) \quad (53)$$
$$FR_x \to FR'_x = \frac{FR_z}{FF_z + FR_z}(FF_x + FR_x)$$

Then, the force $F_f$ acting on the front fork and the force $F_1$ acting on the suspension may be calculated by the following Equations (54) and (55).

[Formula 52]

$$F_f = FF_z \cos \epsilon_F - FF'_x \sin \epsilon_F \quad (54)$$

$$= D_F \left(\omega_{ro}, \omega_{ya}, \omega_{pi}, \dot{\omega}_{ro}, \dot{\omega}_{ya}, \dot{\omega}_{pi}, G_x, \zeta, \dot{\zeta}, \theta, \phi, V_x, L, L', h, R_{cr}, g, W_x, W_z, I_{xx}, I_{yy}, I_{zz}, I_{xz}, \epsilon_F\right)$$

$$F_1 = (FR_z \cos \epsilon_R - FR'_x \sin \epsilon_R)\kappa(\delta_R) \quad (55)$$

$$= D_R \left(\omega_{ro}, \omega_{ya}, \omega_{pi}, \dot{\omega}_{ro}, \dot{\omega}_{ya}, \dot{\omega}_{pi}, G_x, \zeta, \dot{\zeta}, \theta, \phi, V_x, L, L', h, R_{cr}, g, W_x, W_z, I_{xx}, I_{yy}, I_{zz}, I_{xz}, \delta_R\right)$$

Figure 12:
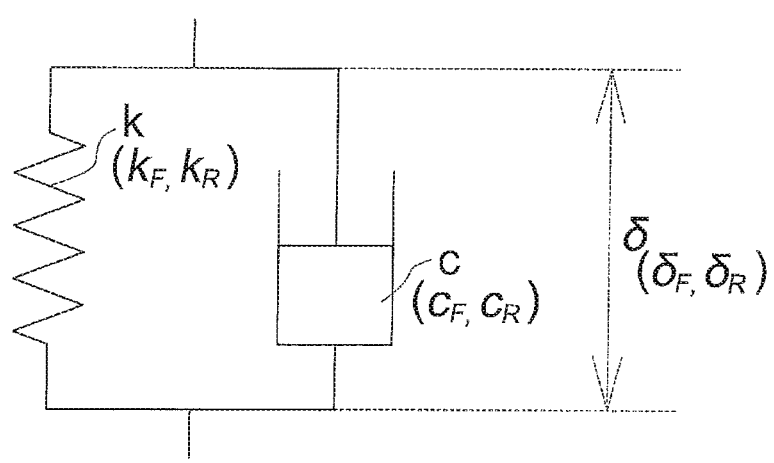
FIG. 12 shows an equivalent circuit modeling the shock absorber of the suspension.

FIG. 12 is an equivalent circuit modeling the shock absorber of the suspension. The suspension may be represented by a parallel model with a spring k and a damper c as shown in FIG. 12 in an equivalent manner. Creating a motion equation based on this equivalent circuit gives the equation provided below. The stroke quantity of the shock absorber of each suspension, the spring constant of each shock absorber, the damper coefficient of each shock absorber, and the preset load applied to each spring will be denoted by the characters shown in the following table.

TABLE 6

| Parameter | Meaning |
|---|---|
| $\delta_F$ | stroke quantity of shock absorber of front-wheel suspension |
| $\delta_R$ | stroke quantity of shock absorber of rear-wheel suspension |

TABLE 6-continued

| Parameter | Meaning |
|---|---|
| $k_F$ | spring coefficient of shock absorber of front-wheel suspension |
| $k_R$ | spring coefficient of shock absorber of rear-wheel suspension |
| $c_F$ | attenuation coefficien of shock absorber of front-wheel suspension |
| $c_R$ | attenuation coefficient of shock absorber of rear-wheel suspension |
| $l_F$ | preset load applied to shock absorber of front-wheel suspension |
| $l_R$ | preset load applied to shock absorber of rear-wheel suspension |

[Formula 53]

$$c_F \dot{\delta}_F + k_F \delta_F = FF_z \cos \epsilon_F + FF'_x \sin \epsilon_F - l_F \quad (56)$$
$$= D_f(\cdots) - l_F$$

$$c_R \dot{\delta}_R + k_R \delta_R = (FR_z \cos \epsilon_R - FR'_x \sin \epsilon_R) \kappa(\epsilon_R) - l_R \quad (57)$$
$$= D_R(\cdots) - l_R$$

In Equations (56) and (57), the parameters in the function $D_F$ in Equation (54) and the function $D_R$ in Equation (55) are omitted.

Solving the differential equation of Equations (56) and (57) gives the following equation.

[Formula 54]

$$\delta_F = \exp\left(-\frac{k_F}{c_F}t\right) \int_0^t \frac{D_F(\cdots) - l_F}{c_F} \exp\left(\frac{k_F}{c_F}\tau\right) d\tau \quad (58)$$

$$\delta_R = \exp\left(-\frac{k_R}{c_R}t\right) \int_0^t \frac{D_R(\cdots) - l_R}{c_R} \exp\left(\frac{k_R}{c_R}\tau\right) d\tau$$

As discussed above, the suspension stroke quantity estimation unit 70 may calculate the stroke quantity of the shock absorber of the suspension by solving the differential equations in Equations (56) and (57), or calculate the stroke quantity of the shock absorber of the suspension by performing a discretization process over time.

Further, the suspension stroke quantity estimation unit 70 may calculate the amount of sink $\delta_W$ of the rear suspension by performing calculation based on the following equation.

[Formula 55]

$$\delta_W = \int_0^{\delta_R} \kappa(\delta) d\delta \quad (59)$$

<Configuration of Elevation/Depression Angle Estimation Unit>

The elevation/depression angle estimation unit 80 calculates the elevation/depression angle $\zeta$ based on the estimation results from the load estimation unit 60 and suspension stroke quantity estimation unit 70.

If the suspension of the front wheel sinks by the amount of sink $\delta_F$ and the suspension of the rear wheel sinks by the amount of sink $\delta_W$, the positional vector $F_o$ of the center of the front wheel and the positional vector $R_o$ of the center of the rear wheel may be expressed by the following equations.

[Formula 56]

$$F_o = [e_b] \begin{bmatrix} -\delta_F \sin \epsilon_F \\ 0 \\ \delta_F \cos \epsilon_F \end{bmatrix} \quad (60)$$

$$R_o = [e_b] \begin{bmatrix} -\int_0^{\delta_W} \sin \epsilon_R(\delta) d\delta \\ 0 \\ \int_0^{\delta_W} \cos \epsilon_R(\delta) d\delta \end{bmatrix}$$

Based on Equations (59) and (60), the elevation/depression angle may be calculated by the following equation.

[Formula 57]

$$\tan \zeta = \frac{\delta_F \cos \epsilon_F - \int_0^{\delta_W} \cos \epsilon_R(\delta) d\delta}{L' - \delta_F \sin \epsilon_F + L + \int_0^{\delta_W} \sin \epsilon_R(\delta) d\delta} + \zeta_0 \quad (61)$$

In Equation (61), $\zeta_0$ is the angle formed by the basis vector $e_b$ of the vehicle coordinate system and the basis vector $e_r$ of the road-surface coordinate system found when the stroke quantity of the suspension is zero.

<Configuration of Slope Estimation Unit>

Based on the estimation results from the elevation/depression angle estimation unit 80 and the estimation results from the Kalman filter 50, the slope estimation unit 90 calculates the longitudinal slope $\eta$ of the road surface.

The longitudinal slope $\eta$ of the road surface is expressed by the following equation using the pitch angle $\theta$, roll angle $\varphi$ and elevation/depression angle $\zeta$ of the vehicle 100.

[Formula 58]

$$\sin \eta = \sin \theta \cos \zeta - \cos \theta \cos \varphi \sin \zeta \quad (62)$$

Thus, the longitudinal slope $\eta$ of the road surface may be calculated by the following equation.

[Formula 59]

$$\eta = \sin^{-1}(\sin \theta \cos \theta - \cos \theta \cos \varphi \sin \zeta) \quad (63)$$

<Calculation of Estimated Values for Parameters>

Now, the ability of the attitude estimation apparatus according to the present embodiment to estimate the attitude of the vehicle 100 with high accuracy will be proven with reference to examples.

Figure 13A:
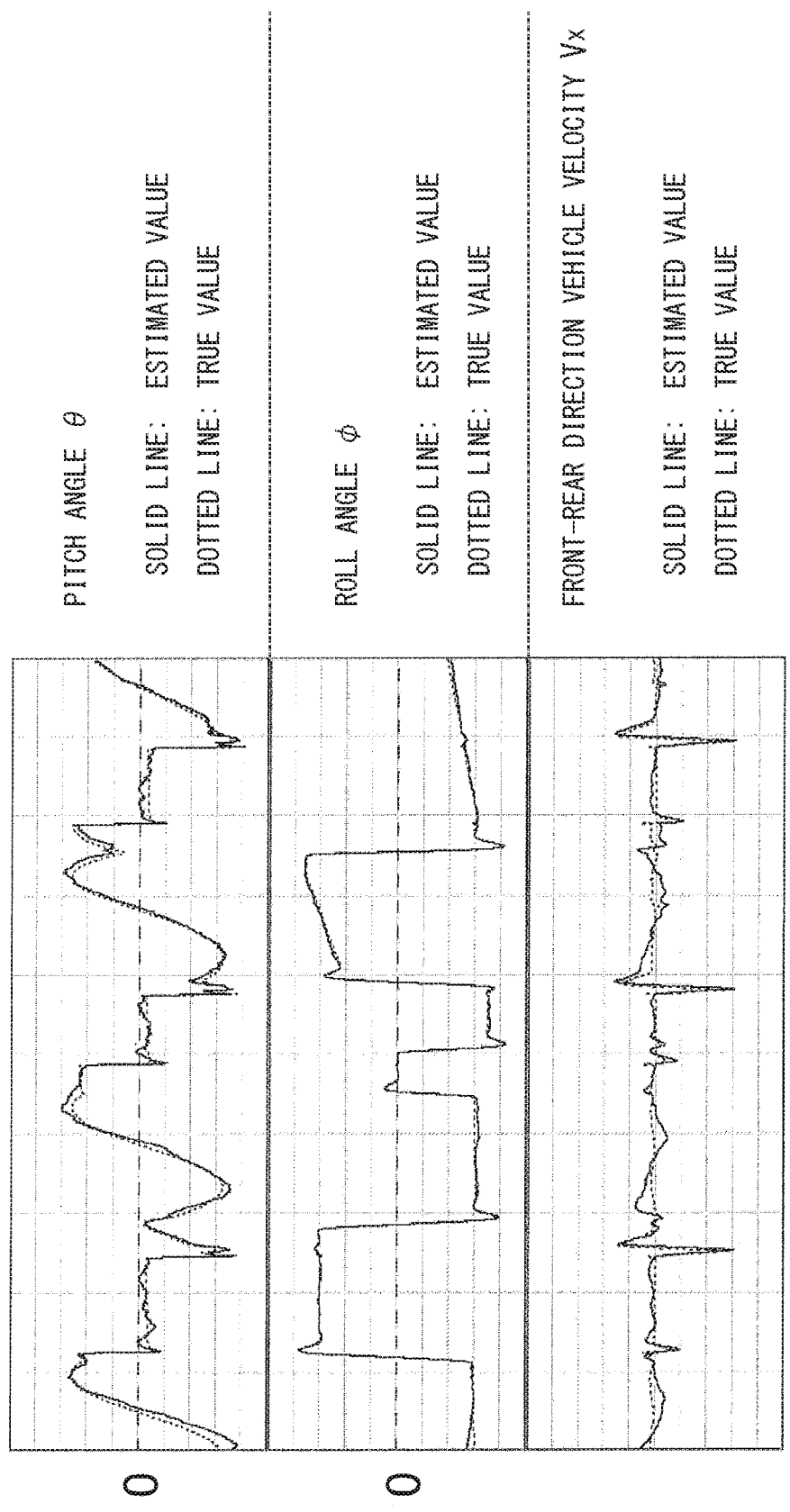
FIG. 13A illustrates how the estimated values of various parameters change over time.
Figure 13C:
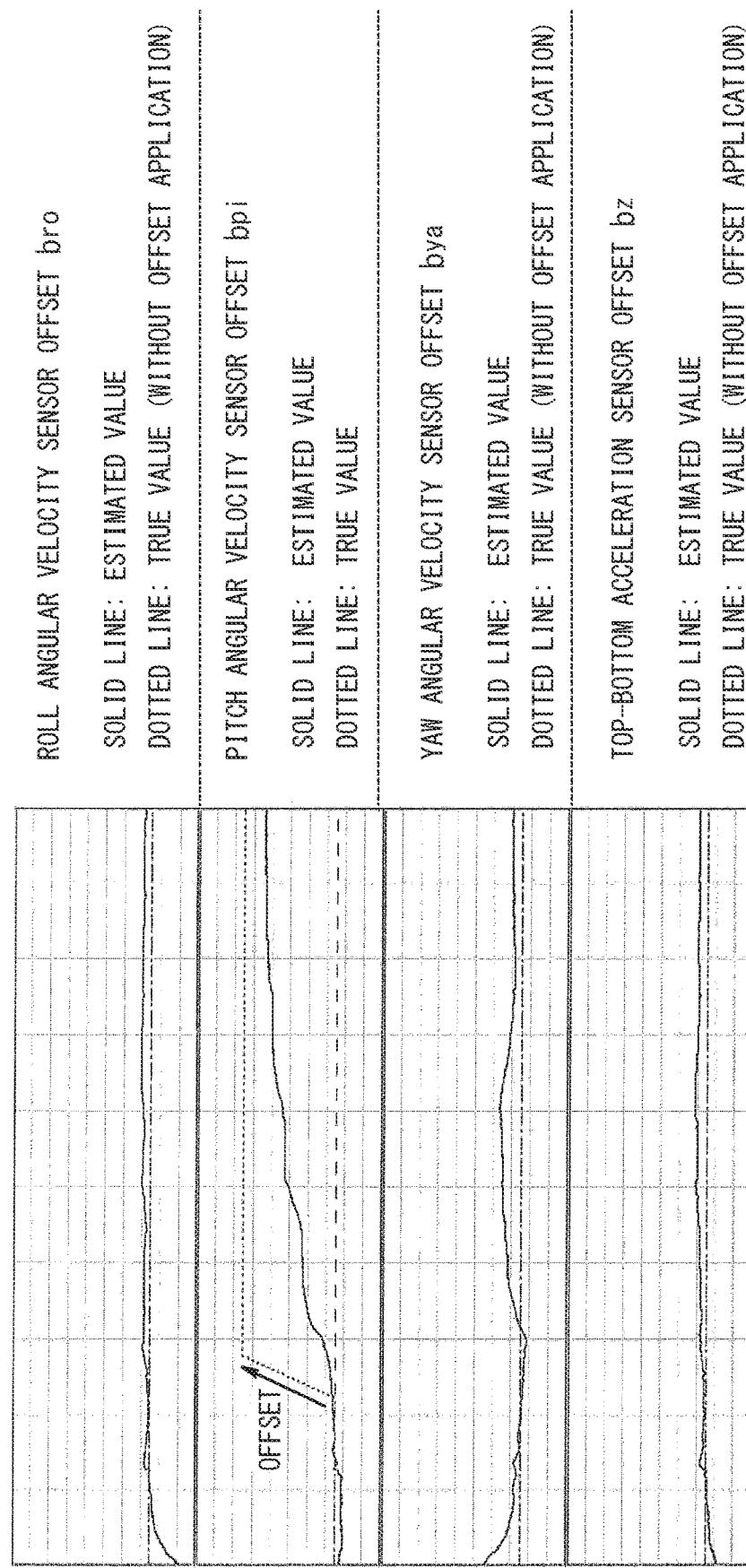
FIG. 13C illustrates how the estimated values of various parameters change over time.
Figure 13E:
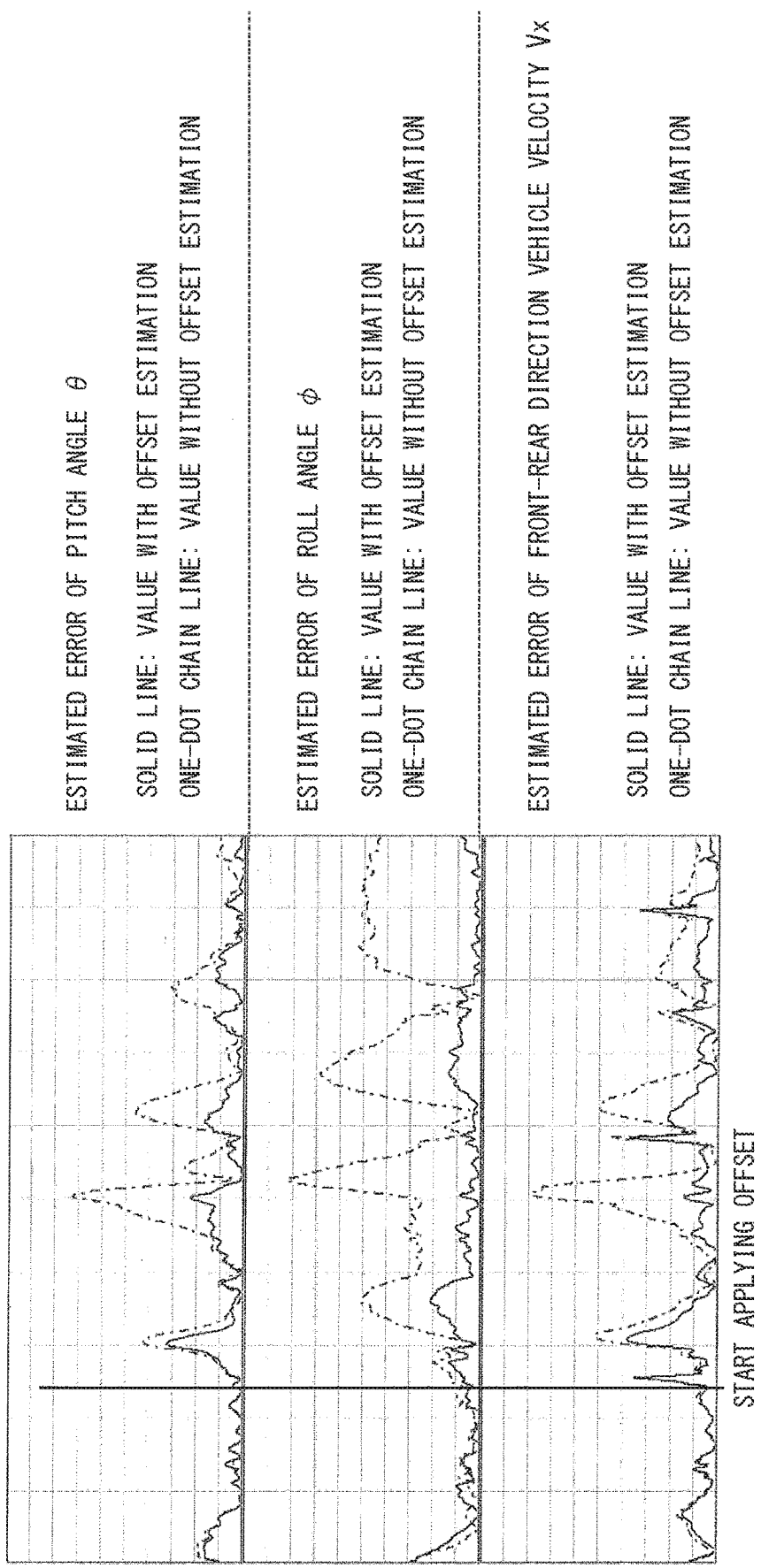
FIG. 13E illustrates how the estimated values of various parameters change over time.
Figure 13F:
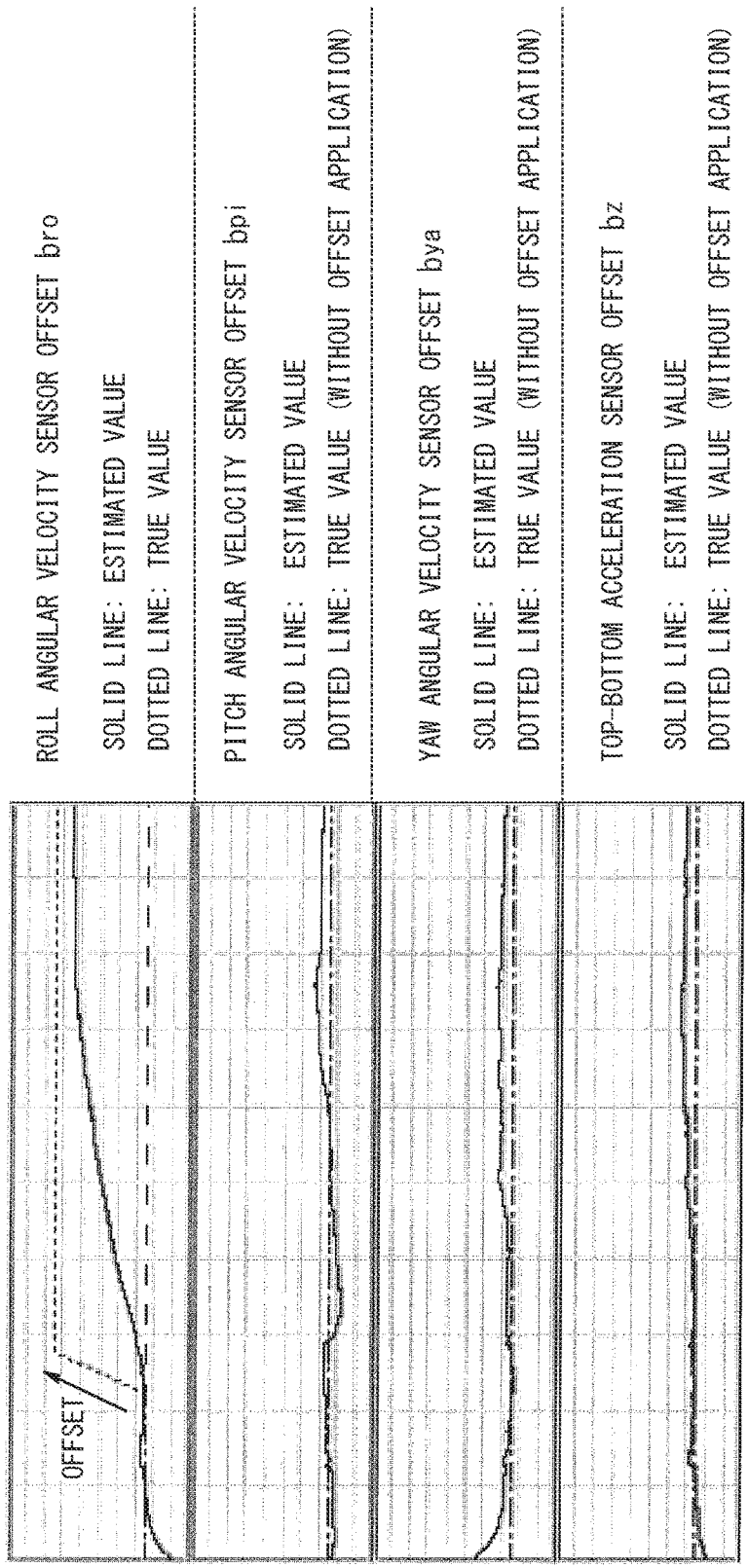
FIG. 13F illustrates how the estimated values of various parameters change over time.
Figure 13G:
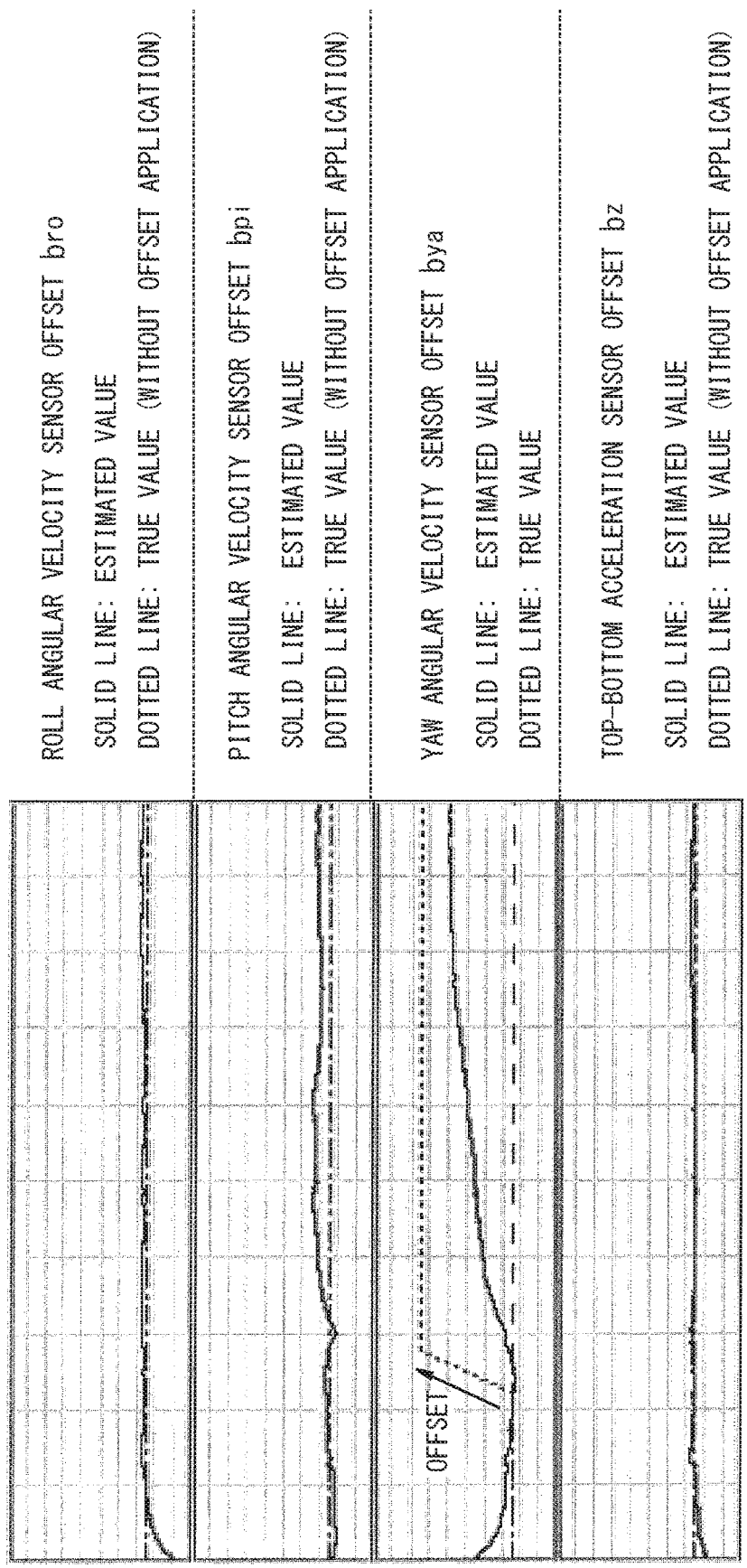
FIG. 13G illustrates how the estimated values of various parameters change over time.
Figure 13H:
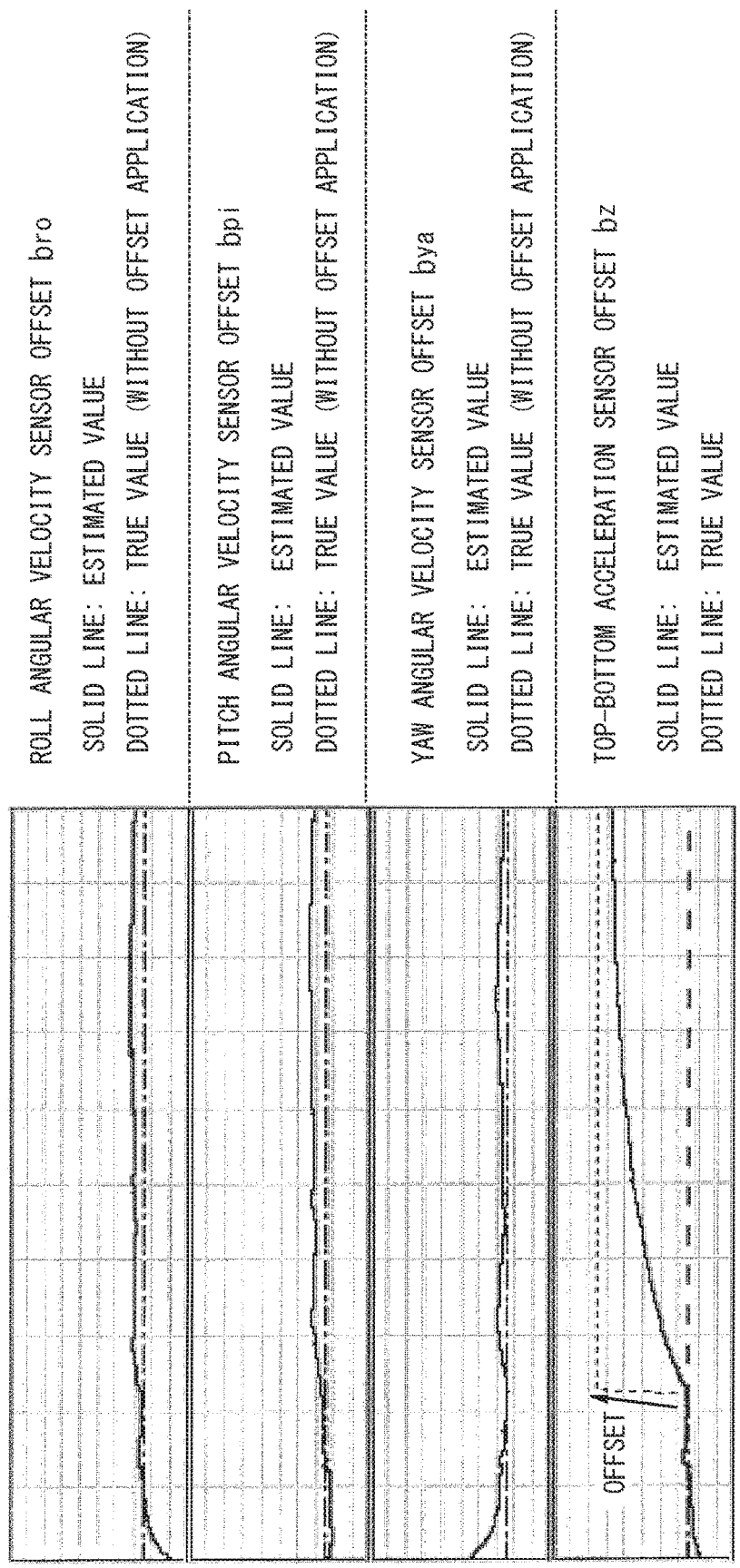
FIG. 13H illustrates how the estimated values of various parameters change over time.
Figure 13I:
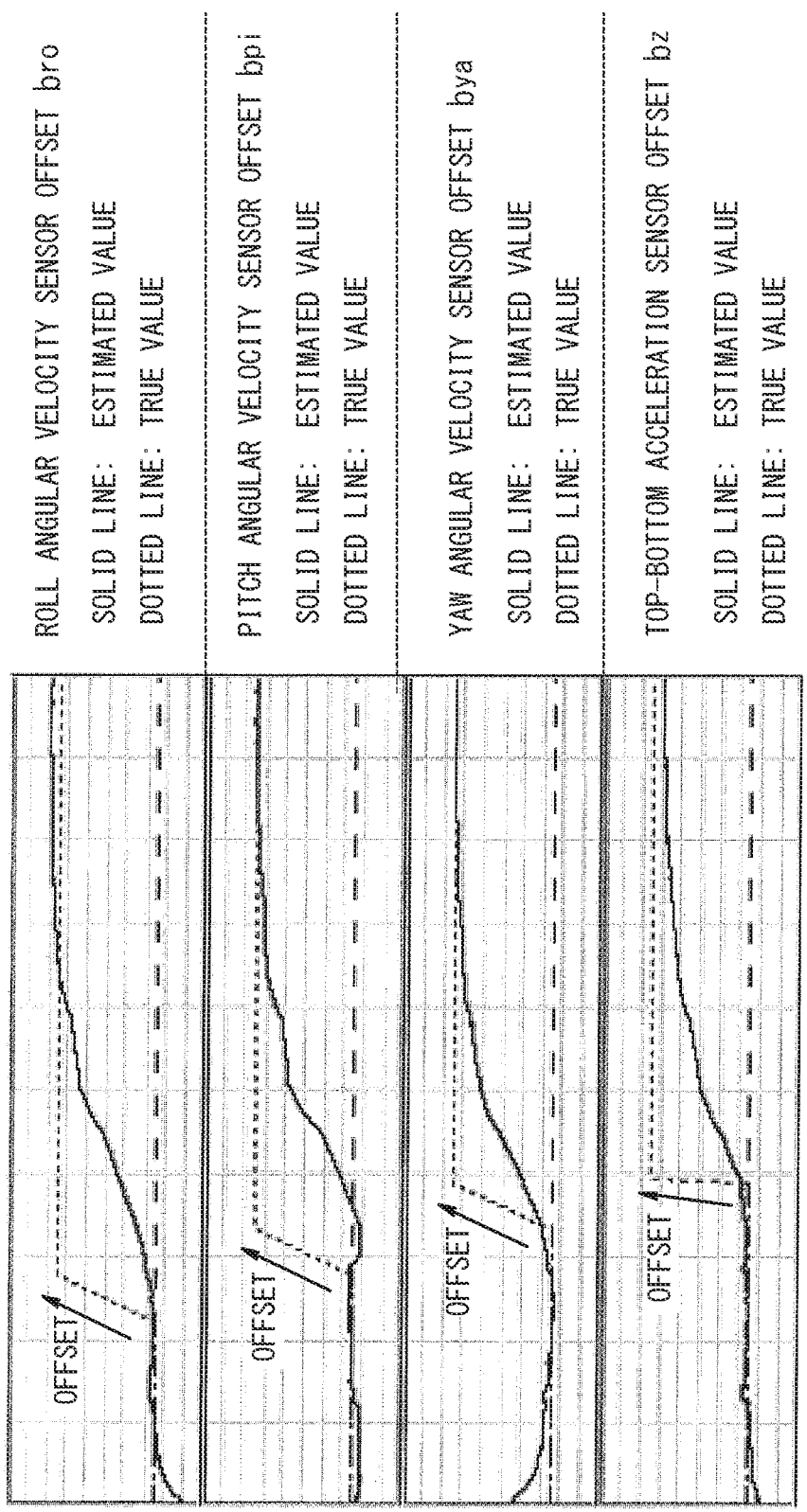
FIG. 13I illustrates how the estimated values of various parameters change over time.
Figure 13J:
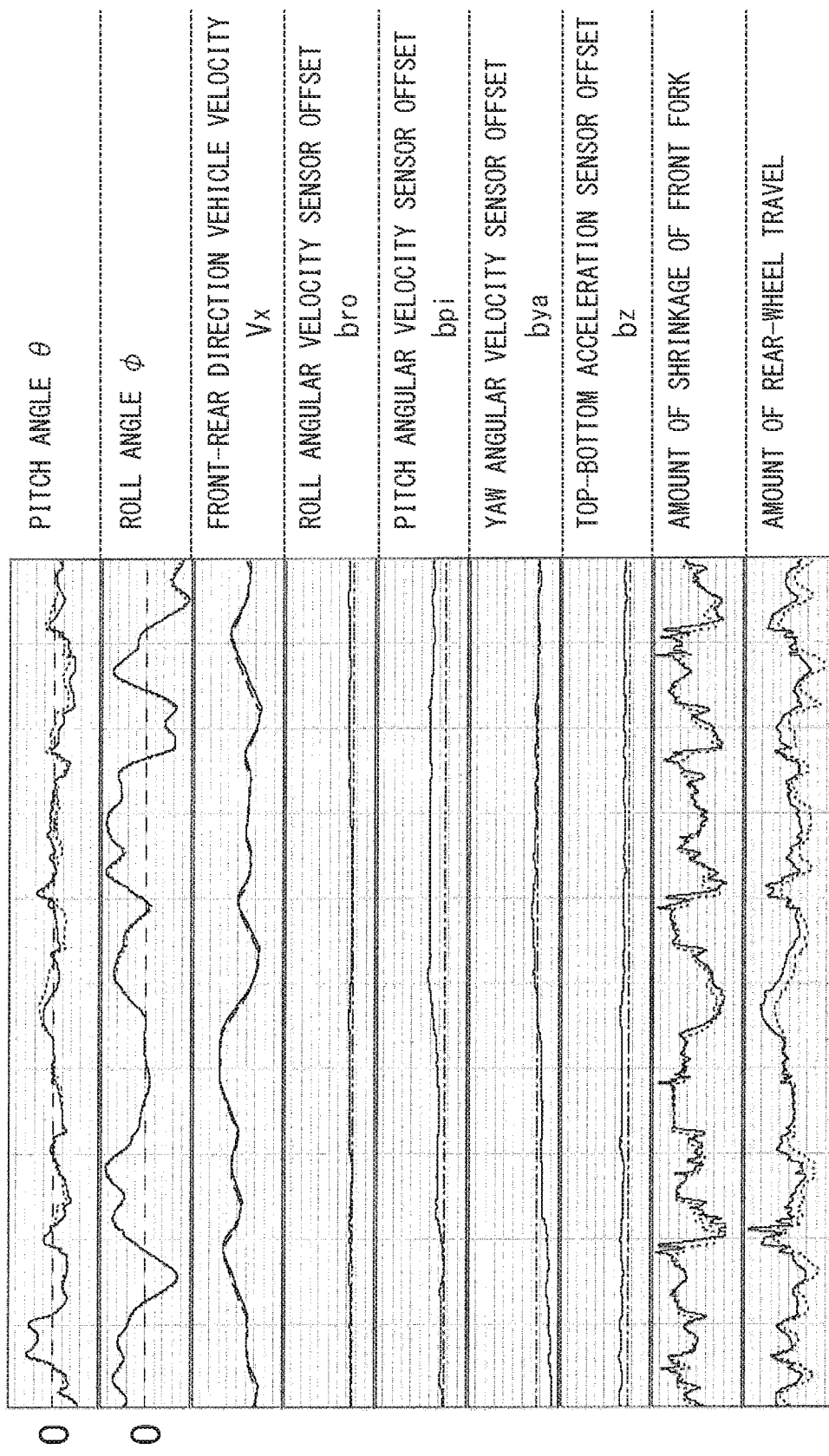
FIG. 13J illustrates how the estimated values of various parameters change over time.

FIGS. 13A to 13J show graphs showing the estimation results for the attitude of the vehicle 100 using the attitude estimation apparatus while the vehicle 100 was travelling on a predetermined road surface. FIGS. 13A to 13I show the results of simulations made while the vehicle 100 traveled freely on a road surface having a horizontal surface portions and slopes. FIG. 13J shows the results of simulations made while the vehicle 100 traveled on a circuit course, generally consisting of horizontal surface portions, while the rider was actively leaning over and turning the vehicle.

FIG. 13A shows the calculation results of the estimated values of the various parameters based on the detected values of the mounted roll angular velocity sensor 21, yaw angular velocity sensor 22, pitch angular velocity sensor 23, top-bottom acceleration sensor 24, front-rear acceleration sensor 25, left-right acceleration sensor 26, and rear-wheel velocity sensor 7 having no offset error. To simulate actual situations, white noise is superimposed on the detected values from the sensors provided to the Kalman filter 50.

FIG. 13A demonstrates that the Kalman filter 50 achieved an estimation close to the true value for each of the pitch angle $\theta$, roll angle $\varphi$ and front-rear direction vehicle velocity $V_x$.

FIG. 13B shows graphs showing the calculation results of the estimated values from the suspension stroke quantity estimation unit 70, elevation/depression angle estimation unit 80 and slope estimation unit 90 based on the estimated values estimated by the Kalman filter 50 in FIG. 13A. FIG. 13B demonstrates that the suspension stroke quantity estimation unit 70 achieved an estimation of the amount of shrinkage of the front fork close to the true value. FIG. 13B demonstrates that the various estimation units achieved estimations of the amount of shrinkage of the front fork, amount of rear-wheel travel and slope of road surface close to the true value.

FIG. 13C shows graphs showing the estimated values found when a predetermined offset error (1 deg/sec in this example) was superimposed on the detected value of the pitch angular velocity sensor 23 at a predetermined moment. In this simulation, too, white noise is superimposed on the detected values from the sensors provided to the Kalman filter 50.

In FIG. 13C, the estimated value of the pitch angular velocity sensor offset $b_{pi}$ increases after a predetermined moment, indicating that an estimation close to the true value was achieved. The estimated values of the other sensor offsets are zero, again indicating that an estimation close to the true value was achieved.

FIGS. 13D and 13E show graphs indicating the accuracy with which the pitch angle, roll angle and vehicle-body velocity were estimated under the same condition as FIG. 13C. FIG. 13E shows the results shown in FIG. 13D with a different representation method, and shows graphs of the absolute values of the differences between estimated values and true values. FIGS. 13D and 13E demonstrate that, when an offset error occurred in the pitch angular velocity sensor 23, an estimation closer to the true value was achieved when an offset in the pitch angular velocity sensor 23 was estimated than when no offset was estimated for each of the pitch angle θ, roll angle φ and front-rear direction vehicle velocity $V_x$.

FIGS. 13F to 13I show graphs showing the estimation results found when offset errors were also generated in the sensors other than the pitch angular velocity sensor 23. FIG. 13F indicates the estimated values found when an offset of 1 deg/sec was superimposed in the roll angular velocity sensor 21 after a predetermined period of time. FIG. 13G indicates the estimated values found when an offset of 1 deg/sec was superimposed in the yaw angular velocity sensor 22 after a predetermined period of time. FIG. 13H indicates the estimated values found when an offset of 100 mG was superimposed in the top-bottom acceleration sensor 24 after a predetermined period of time.

FIG. 13I indicates the estimated values found when offsets were superimposed in all the sensors in a combined manner. Specifically, an offset of 1 deg/sec was superimposed in the roll angular velocity sensor 21 after 40 seconds, an offset of 1 deg/sec was superimposed in the pitch angular velocity sensor 23 after 50 seconds, an offset of 1 deg/sec was superimposed in the yaw angular velocity sensor 22 after 60 seconds, and an offset of 100 mG was superimposed in the top-bottom acceleration sensor 24 after 70 seconds.

FIGS. 13F to 13I demonstrate that, in each case, the values of the sensor offsets were estimated with high accuracy without being interfered with by other offsets.

Further, as shown in FIG. 13J, it can be understood that the values of the various angles and offsets can be estimated with high accuracy even when the rider drives violently. In FIG. 13J, too, estimated values are represented by solid lines and true values are represented by dotted lines.

<Effects>

The attitude estimation apparatus 10 according to the present embodiment estimates the pitch angle θ, roll angle φ and vehicle velocity $V_x$, as well as roll angular velocity sensor offset $b_{ro}$, yaw angular velocity sensor offset $b_{ya}$, pitch angular velocity sensor offset $b_{pi}$, and top-bottom acceleration sensor offset $b_z$, and the estimated values are used in the subsequent estimation operation.

Particularly, the estimated value of an offset error in the angular velocity sensors, in which an offset is more likely to occur than in the acceleration sensors, is used in the subsequent estimation operation. This will sufficiently improve the accuracy with which the pitch angle θ, roll angle φ and vehicle velocity $V_x$ are estimated. Further, the attitude estimation apparatus according to the present embodiment uses the estimated value of an offset error in the top-bottom acceleration sensor 24 in the subsequent estimation operation. This will further improve estimation accuracy when the roll angle φ is in a small range.

Further, the attitude estimation apparatus 10 according to the present embodiment uses, for the estimation operation, the detected value of the rear-wheel velocity $v_r$ detected by the rear-wheel velocity sensor 7. Thus, even when the vehicle 100 turns at low speed with a small radius, pitch angle θ, roll angle φ, vehicle velocity $V_x$, roll angular velocity sensor offset $b_{ro}$, yaw angular velocity sensor offset $b_{ya}$, pitch angular velocity sensor offset $b_{pi}$, and top-bottom acceleration sensor offset $b_z$ can be estimated with high accuracy.

Thus, the attitude estimation apparatus 10 estimates the attitude of the vehicle body 1 with high accuracy. This will make it possible to control the navigation system 12 or headlight driving device 15 with high accuracy based on information relating to the attitude of the vehicle body 1 estimated by the ECU 20, for example. Further, based on this information relating to the estimated attitude of the vehicle body 1, the driving power, braking force and suspension of the vehicle 100 may be controlled.

Other Embodiments

Other embodiments will be described below.

<1> In the embodiment described above, the Kalman filter 50 estimates the top-bottom acceleration offset $b_z$. Alternatively, the Kalman filter 50 may estimate the front-rear acceleration offset $b_x$ instead of the top-bottom acceleration offset $b_z$. In such implementations, the Kalman filter 50, at the system equation calculation unit 51, performs calculation using Equation (64) provided below, instead of Equation (45), as the system equation, and, at the observation equation calculation unit 52, performs calculation using Equation (65) provided below, instead of Equation (46), as the observation equation.

[Formula 60]

$$\frac{d}{dt}\begin{bmatrix} \phi \\ \theta \\ V_x \\ b_{ro} \\ b_{pi} \\ b_{ya} \\ b_x \end{bmatrix} = \begin{bmatrix} \dot{\theta}(\omega_{pi} - b_{pi}, \omega_{ya} - b_{ya}, \phi) \\ \dot{\phi}(\omega_{ro} - b_{ro}, \omega_{pi} - b_{pi}, \omega_{ya} - b_{ya}, \theta, \phi) \\ A_x(\omega_{ro} - b_{ro}, \omega_{ya} - b_{ya}, \omega_{pi} - b_{pi}, \dot{\omega}_{ro}, \dot{\omega}_{ya}, \dot{\omega}_{pi}, G_x, \theta, \phi, V_x, \zeta, L, h, R_{cr}, g) \\ 0 \\ 0 \\ 0 \\ 0 \end{bmatrix} \quad (64)$$

[Formula 61]

$$\begin{bmatrix} G_y \\ G_z \\ v_r \\ 0 \end{bmatrix} = \begin{bmatrix} A_y(\omega_{ro} - b_{ro}, \omega_{ya} - b_{ya}, \omega_{pi} - b_{pi}, \dot{\omega}_{ro}, \dot{\omega}_{ya}, \dot{\omega}_{pi}, \zeta, \theta, \phi, V_x, L, h, R_{cr}, g) \\ A_z(\omega_{ro} - b_{ro}, \omega_{ya} - b_{ya}, \omega_{pi} - b_{pi}, \dot{\omega}_{ro}, \dot{\omega}_{ya}, \dot{\omega}_{pi}, \zeta, \dot{\zeta}, \theta, \phi, V_x, L, h, R_{cr}, g) \\ \dfrac{\sec \zeta}{1 - R_{cr}/R_e(1 - \cos \phi)} V_x \\ Q_x(\omega_{ro} - b_{ro}, \omega_{ya} - b_{ya}, \omega_{pi} - b_{pi}, \dot{\omega}_{ro}, \dot{\omega}_{ya}, \dot{\omega}_{pi}, G_x - b_x, \zeta, \dot{\zeta}, \theta, \phi, V_x, L, h, R_{cr}, g, W_x, W_z, I_{xx}, I_{yy}, I_{zz}, I_{xz}) \end{bmatrix} \quad (65)$$

Figure 14:
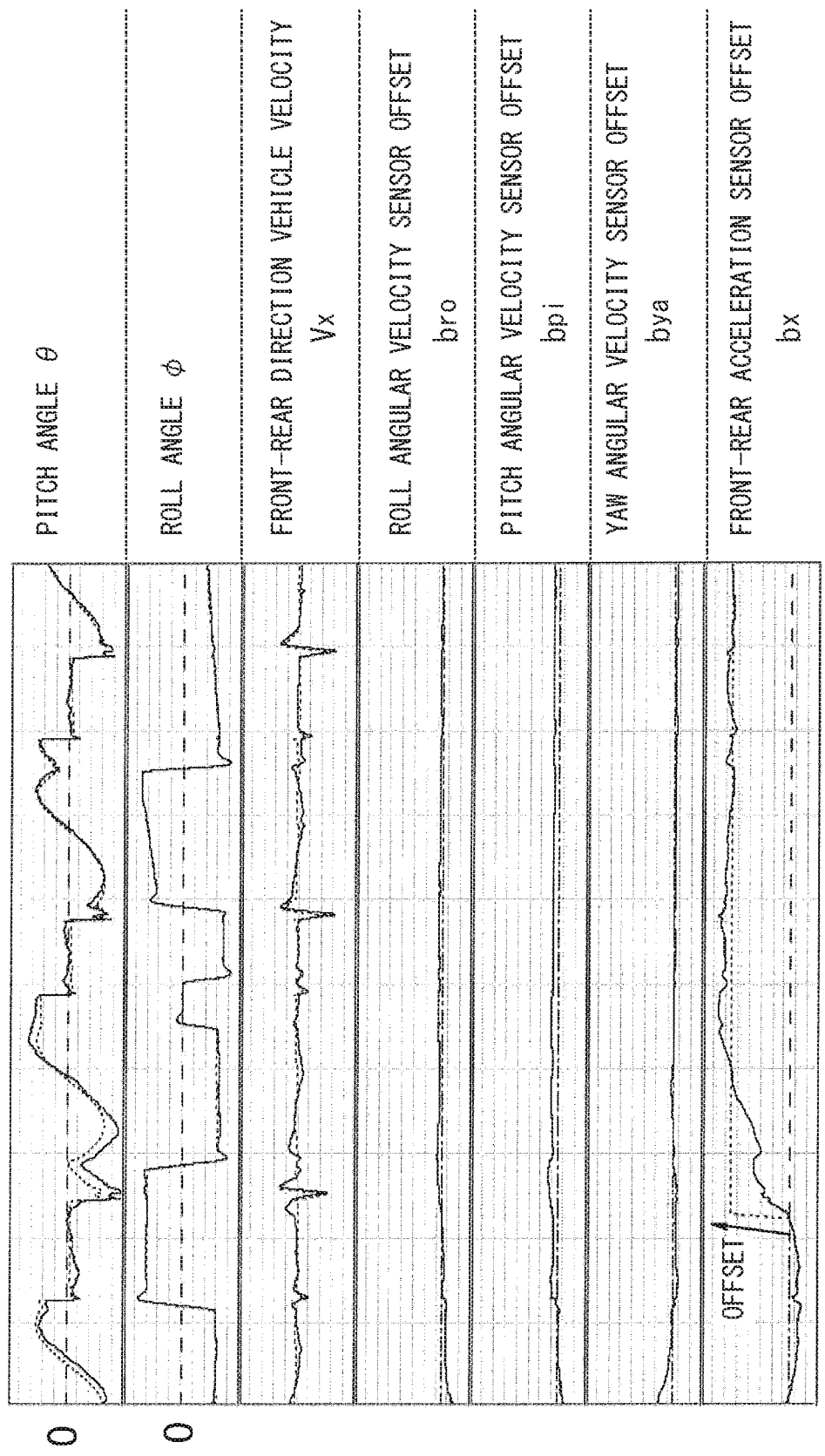
FIG. 14 illustrates how the estimated values of various parameters change over time.

Similar to FIGS. 13A to 13J, FIG. 14 shows graphs showing estimated values relating to the attitude of the vehicle 100 using the attitude estimation apparatus while the vehicle 100 was travelling on a predetermined road surface. FIG. 14 indicates the various estimated values obtained when a predetermined offset error (100 mG in this example) was superimposed on the detected value of the front-rear acceleration sensor 25 after a predetermined period of time. In FIG. 14, similarly to FIGS. 13A to 13J, the estimated values are represented by solid lines and the true values are represented by dotted lines.

In FIG. 14, the estimated value of the front-rear angular velocity sensor offset $b_x$ increases after a predetermined moment, indicating that an estimation close to the true value was achieved. The estimated values of the other sensor offsets are zero, again indicating that an estimation close to the true value was achieved.

Similarly, the Kalman filter 50 may estimate the left-right acceleration offset $b_y$ instead of the top-bottom acceleration offset $b_z$. In such implementations, the Kalman filter 50, at the system equation calculation unit 51, performs calculation using Equation (66) provided below, instead of Equation (45), as the system equation, and, at the observation equation calculation unit 52, performs calculation using Equation (67) provided below, instead of Equation (46), as the observation equation.

[Formula 62]

$$\frac{d}{dt}\begin{bmatrix} \phi \\ \theta \\ V_x \\ b_{ro} \\ b_{pi} \\ b_{ya} \\ b_x \end{bmatrix} = \begin{bmatrix} \dot{\theta}(\omega_{pi} - b_{pi}, \omega_{ya} - b_{ya}, \phi) \\ \dot{\phi}(\omega_{ro} - b_{ro}, \omega_{pi} - b_{pi}, \omega_{ya} - b_{ya}, \theta, \phi) \\ A_x(\omega_{ro} - b_{ro}, \omega_{ya} - b_{ya}, \omega_{pi} - b_{pi}, \dot{\omega}_{ro}, \dot{\omega}_{ya}, \dot{\omega}_{pi}, G_x, \theta, \phi, V_x, \zeta, L, h, R_{cr}, g) \\ 0 \\ 0 \\ 0 \\ 0 \end{bmatrix} \quad (66)$$

$$\frac{d}{dt}\begin{bmatrix} \phi \\ \theta \\ V_x \\ b_{ro} \\ b_{pi} \\ b_{ya} \\ b_x \end{bmatrix} = \begin{bmatrix} \dot{\theta}(\omega_{pi} - b_{pi}, \omega_{ya} - b_{ya}, \phi) \\ \dot{\phi}(\omega_{ro} - b_{ro}, \omega_{pi} - b_{pi}, \omega_{ya} - b_{ya}, \theta, \phi) \\ A_x(\omega_{ro} - b_{ro}, \omega_{ya} - b_{ya}, \omega_{pi} - b_{pi}, \dot{\omega}_{ro}, \dot{\omega}_{ya}, \dot{\omega}_{pi}, G_x, \theta, \phi, V_x, \zeta, L, h, R_{cr}, g) \\ 0 \\ 0 \\ 0 \\ 0 \end{bmatrix} \quad (66)$$

[Formula 63]

$$\begin{bmatrix} G_y \\ G_z \\ v_r \\ 0 \end{bmatrix} = \begin{bmatrix} A_y(\omega_{ro} - b_{ro}, \omega_{ya} - b_{ya}, \omega_{pi} - b_{pi}, \dot{\omega}_{ro}, \dot{\omega}_{ya}, \dot{\omega}_{pi}, \zeta, \theta, \phi, V_x, L, h, R_{cr}, g) \\ A_z(\omega_{ro} - b_{ro}, \omega_{ya} - b_{ya}, \omega_{pi} - b_{pi}, \dot{\omega}_{ro}, \dot{\omega}_{ya}, \dot{\omega}_{pi}, \zeta, \dot{\zeta}, \theta, \phi, V_x, L, h, R_{cr}, g) \\ \dfrac{\sec \zeta}{1 - R_{cr}/R_e(1 - \cos \phi)} V_x \\ Q_x(\omega_{ro} - b_{ro}, \omega_{ya} - b_{ya}, \omega_{pi} - b_{pi}, \dot{\omega}_{ro}, \dot{\omega}_{ya}, \dot{\omega}_{pi}, G_x - b_x, \zeta, \dot{\zeta}, \theta, \phi, V_x, L, h, R_{cr}, g, W_x, W_z, I_{xx}, I_{yy}, I_{zz}, I_{xz}) \end{bmatrix} \quad (67)$$

Figure 15:
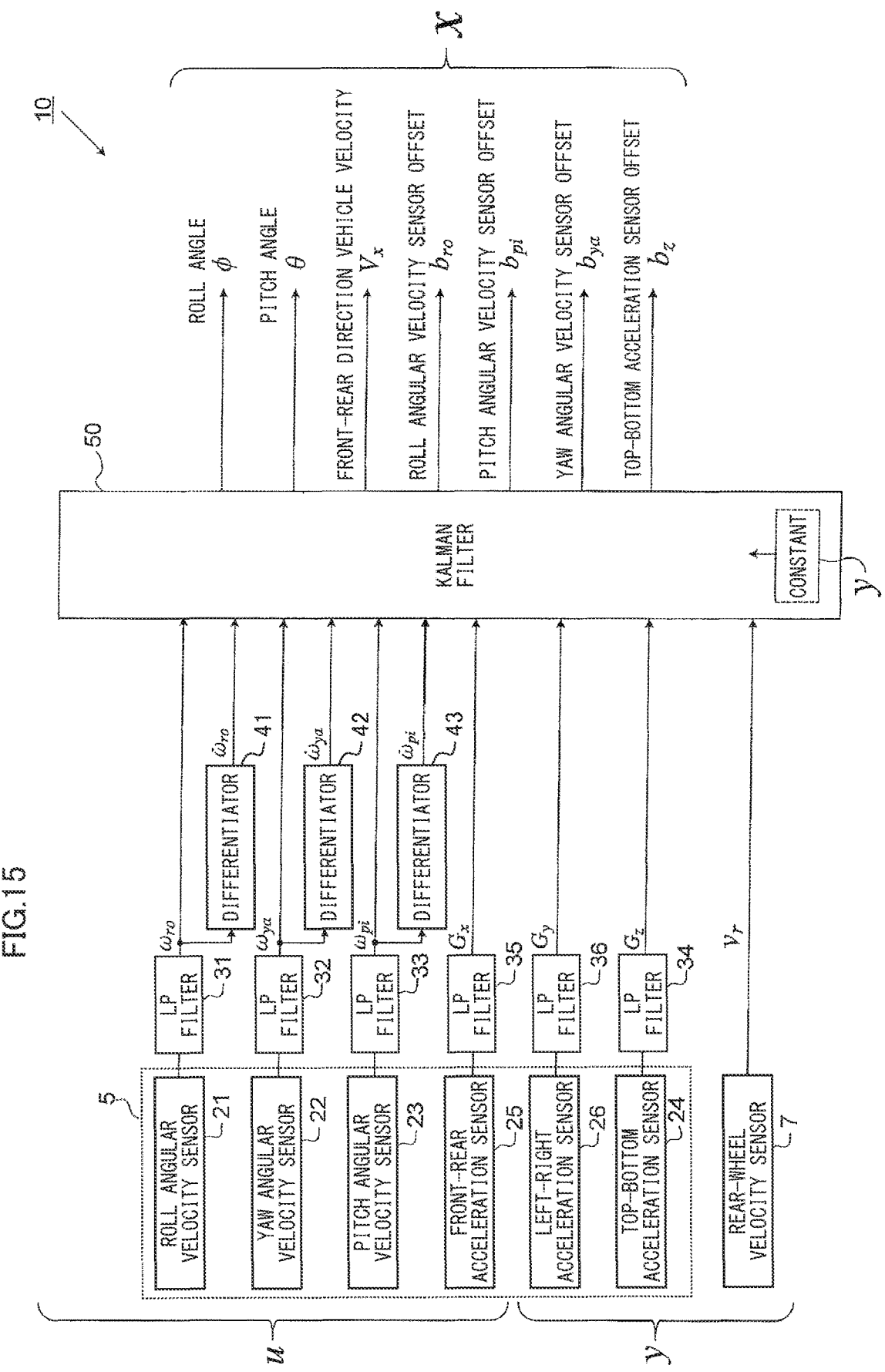
FIG. 15 is a schematic block diagram of an exemplary configuration of the attitude estimation apparatus.

<2> In the above-described embodiment, the attitude estimation apparatus 10 includes the load estimation unit 60, suspension stroke quantity estimation unit 70, elevation/depression angle estimation unit 80, and slope estimation unit 90. Alternatively, the attitude estimation apparatus 10 may include none of these calculation functionalities. That is, as shown in FIG. 15, the attitude estimation apparatus 10 may include the group of sensors 5, rear-wheel velocity sensor 7, low-pass filters 31, 32, 33, 34, 35 and 36, and differentiators 41, 42, 43 and 45, and Kalman filter 50.

In this case, unlike the arrangement of FIG. 3, the attitude estimation apparatus 10 does not include the functionality for estimating the elevation/depression angle $\zeta$, and thus the Kalman filter 50 does not receive the elevation/depression angle $\zeta$ and the first-order differential value of the elevation/depression angle $\zeta$. Accordingly, the Kalman filter 50 may perform calculation where $\zeta=0$ in the equations provided above. In this arrangement, the vehicle 100 is capable of estimating the attitude of the vehicle body 1 without taking account of movements of the suspension.

Figure 16:
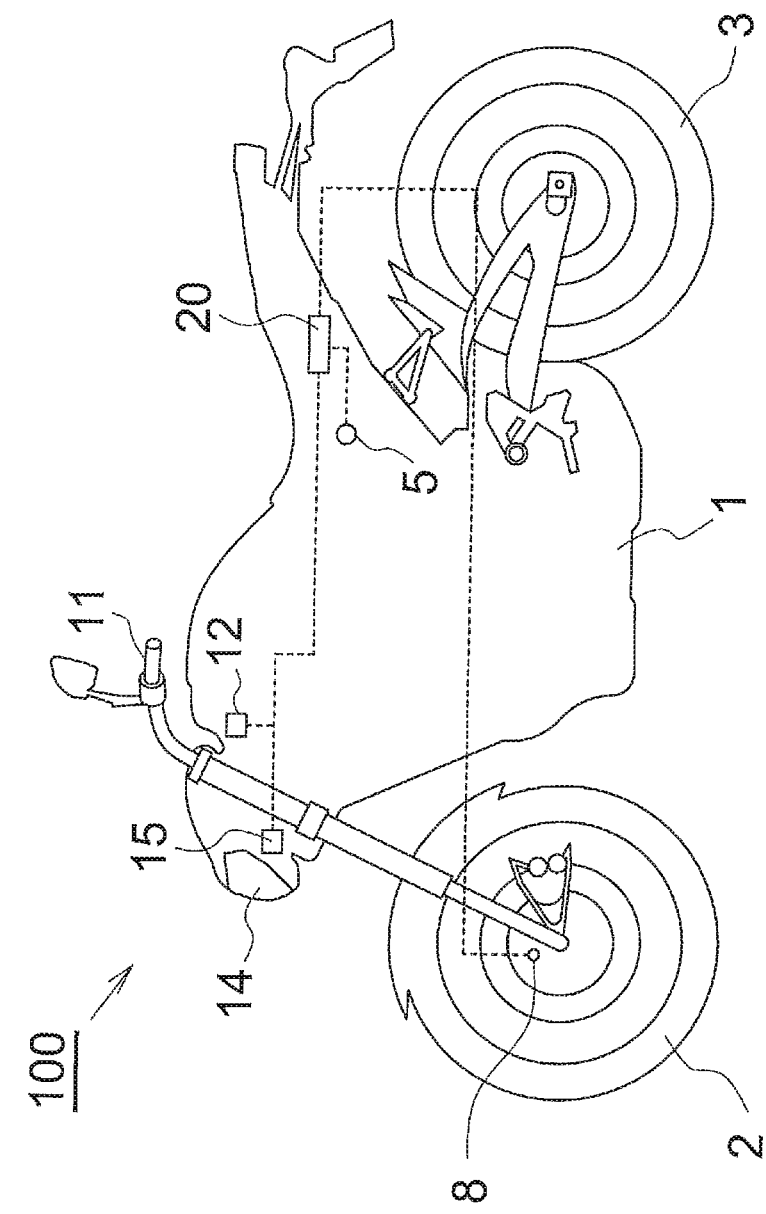
FIG. 16 is a schematic view of a vehicle including the attitude estimation apparatus according to an embodiment.

<3> According to the above-illustrated embodiment, information from the rear-wheel velocity sensor 7 provided on the rear wheel 3 is provided, as the rear-wheel velocity, to the Kalman filter 50. Alternatively, as shown in FIG. 16, information from a front-wheel velocity sensor 8 provided on the front wheel 2 may be provided, as the front-wheel velocity, to the Kalman filter 50. In such implementations, the above-provided equations may be calculated with the vector p replaced by the vector $\sigma$. For calculation, the force vector FF may be read as the force acting on the road-surface grounding point P3 of the rear wheel 3 and the force vector FR may be read as the force acting on the road-surface grounding point P2 of the front wheel 2 to enable the attitude estimation of the vehicle body 1 using the same method as described above.

<4> When the moment of the force acting on the vehicle 100 as viewed from the reference point O is calculated, the aerodynamic vector $\gamma$ may be approximated, $\gamma=0$. In such implementations, the term with $\gamma$ is not present in Equation (33); however, since the relational expression of Equation (27) is used during the process of rearranging Equation (33) to Equation (34) to replace $\gamma$ with the function of another factor, the same equation as Equation (34) is found.

<5> In the above-described embodiment, the group of sensors 5 includes the roll angular velocity sensor 21, yaw angular velocity sensor 22 and pitch angular velocity sensor 23. Alternatively, these angular velocity sensors may be replaced by sensors for detecting the angular velocities about three or more axes different from the top-bottom direction, left-right direction and front-rear direction of the vehicle 100. In such implementations, the detected values from the angular velocity sensors may be replaced by the roll angular velocity $\omega_{ro}$, pitch angular velocity $\omega_{pi}$ and yaw angular velocity $\omega_{ya}$ using a geometrical method. Then, based on the replacement values, the attitude estimation apparatus 10 may perform the calculation defined by the above-provided Equations.

Similarly, in the above-illustrated embodiment, the group of sensors 5 includes the top-bottom acceleration sensor 24, front-rear acceleration sensor 25 and left-right acceleration sensor 26. Alternatively, these acceleration sensors may be replaced by three or more acceleration sensors for directions different from the top-bottom direction, left-right direction and front-rear direction of the vehicle 100. In such implementations, the detected values from the acceleration sensors may be replaced by the top-bottom acceleration $G_z$, front-rear acceleration $G_x$ and left-right acceleration $G_y$ using a geometrical method. Then, based on the replacement values, the attitude estimation apparatus 10 may perform the calculation defined by the above-provided equations.

<6> In the above-illustrated embodiment, one of the input parameters for the Kalman filter 50 is the rear-wheel velocity $v_r$; alternatively, the vehicle velocity detected by a velocity sensor capable of measuring the travel speed (i.e. vehicle velocity) of the vehicle 100 may be an input parameter for the Kalman filter 50. One example may be information from a GPS sensor.

In such implementations, the vehicle velocity $V_X$ estimated by the Kalman filter 50 may be replaced by information relating to the vehicle velocity detected by the sensor. That is, the Kalman filter may not estimate the vehicle velocity $V_x$.

<7> In the above-illustrated embodiment, the Kalman filter 50 may be implemented by the ECU 20 and a program; alternatively, some or all of the functionalities of the Kalman filter 50 may be implemented by hardware such as electronic circuitry.

<8> The Kalman filter 50 according to the above-described embodiments may be replaced by other adaptive filtering methods. For example, the LMS (least mean square) adaptive filter or H∞ filtering may be used.

<9> In the above-illustrated embodiment, the attitude estimation apparatus 10 is applied to a motorcycle; alternatively, if similar modeling is possible, it may be applied to other vehicles such as a motor four-wheeler or motor three-wheeler or various transportation machines such as ships.

In the above-illustrated embodiment, an offset error is a value indicative of the difference between a detected value from each detection unit and an actual value, i.e. true value. The Kalman filter receives detected values from a plurality of detection units. The Kalman filter outputs an estimated value of the roll angle and an estimated value of the pitch angle. Further, the Kalman filter calculates an estimated value of an offset error for the detection unit associated with at least one of the plurality of input detected values. The Kalman filter is configured to calculate the estimated value for the current estimation operation using a plurality of detected values received in the current estimation operation and the estimated values calculated in the previous estimation operation.

In the above-illustrated embodiment, the attitude estimation apparatus receives a detected value from the first angular velocity detection unit, a detected value from the second angular velocity detection unit, a detected value from the third angular velocity detection unit, a detected value from the first acceleration detection unit, a detected value from the second acceleration detection unit, a detected value from the third acceleration detection unit, and a detected value from the velocity information detection unit. The output of the attitude estimation apparatus includes, in addition to estimated values of the roll angle and pitch angle of the movable body, at least one of offset errors for at least one of the first angular velocity detection unit, the second angular velocity detection unit, the third angular velocity detection unit, the first acceleration detection unit, the second acceleration detection unit, and the third acceleration detection unit.

For the current estimation operation, the attitude estimation unit uses at least one of the detected value from the first angular velocity detection unit, the detected value from the second angular velocity detection unit, the detected value from the third angular velocity detection unit, the detected value from the first acceleration detection unit, the detected value from the second acceleration detection unit, the detection value from the third acceleration detection unit and the detected value from the velocity information detection unit, as well as an estimated value from the previous estimation operation, to calculate a current intermediate estimated value. The attitude estimation unit corrects the intermediate estimated value based on the result of a comparison between the previous estimated value and an observed value. The observed value may be at least one of the detected value from the first angular velocity detection unit, the detected value from the second angular velocity detection unit, the detected value from the third angular velocity detection unit, the detected value from the first acceleration detection unit, the detected value from the second acceleration detection unit, the detected value from the third acceleration detection unit and the detected value from the velocity information detection unit. In the above-illustrated examples, the attitude estimation unit calculates a Kalman gain as an example of the value indicating the result of the comparison between the previous estimated value and observed value. The intermediate estimated value is corrected using the value indicating the result of the comparison between the previous estimated value and observed value, and the resulting value is output as the estimated value of the current estimation operation.

EXPLANATION OF REFERENCE CHARACTERS

1: vehicle body
2: front wheel
3: rear wheel
5: group of sensors
7: rear-wheel velocity sensor
8: front-wheel velocity sensor
10: attitude estimation apparatus
11: handlebars
12: navigation system
14: headlight
15: headlight driving device
16: front fork
20: electronic control unit (ECU)
21: roll angular velocity sensor
22: yaw angular velocity sensor
23: pitch angular velocity sensor
24: top-bottom acceleration sensor
25: front-rear acceleration sensor
26: left-right acceleration sensor
31, 32, 33, 34, 35 and 36: low-pass filters
41, 42, 43 and 45: differentiators
50: Kalman filter
51: system equation calculation unit
52: observation equation calculation unit
53: subtractor
54: adder
55: integrator
56: Kalman gain calculation unit
60: load estimation unit
70: suspension stroke quantity estimation unit
80: elevation/depression angle estimation unit
90: slope estimation unit
100: vehicle
200: road surface

What is claimed is:
1. An attitude estimation apparatus for estimating an attitude of a movable body, the attitude estimation apparatus comprising:
a first angular velocity detection sensor configured to detect a first angular velocity, the first angular velocity being an angular velocity of the movable body about a first axis;
a second angular velocity detection sensor configured to detect a second angular velocity, the second angular velocity being an angular velocity of the movable body about a second axis, the second axis being in a direction different from a direction of the first axis;
a third angular velocity detection sensor configured to detect a third angular velocity, the third angular velocity being an angular velocity of the movable body about a third axis, the third axis being in a direction different from the direction of the first axis and the direction of the second axis;
a first acceleration detection sensor configured to detect a first acceleration, the first acceleration being an acceleration of the movable body in a first direction;
a second acceleration detection sensor configured to detect a second acceleration, the second acceleration being an acceleration of the movable body in a second direction, the second direction being different from the first direction;
a third acceleration detection sensor configured to detect a third acceleration, the third acceleration being an acceleration of the movable body in a third direction, the third direction being different from the first direction and the second direction;
a velocity information detection sensor configured to detect information about a moving velocity in a direction of advance of the movable body; and
at least one of an electronic control unit or electronic circuitry configured to implement an attitude estimation unit configured to estimate a roll angle and a pitch angle of the movable body, and to estimate, using a calculation process, an offset error for at least one detection sensor of detection sensors including the first angular velocity detection sensor, the second angular velocity detection sensor, the third angular velocity detection sensor, the first acceleration detection sensor, the second acceleration detection sensor, or the third acceleration detection sensor,
wherein, in a current estimation operation, the attitude estimation unit estimates the roll angle and pitch angle of the movable body and the offset error for the at least one detection sensor based on a detected value from the first angular velocity detection sensor, a detected value from the second angular velocity detection sensor, a detected value from the third angular velocity detection sensor, a detected value from the first acceleration detection sensor, a detected value from the second acceleration detection sensor, a detected value from the third acceleration detection sensor, a detected value from the velocity information detection sensor, an estimated value of the roll angle from a previous estimation operation, an estimated value of the pitch angle from the previous estimation operation, and an estimated value of the offset error from the previous estimation operation;
wherein the attitude estimation unit estimates offset errors for the first angular velocity detection sensor, the second angular velocity detection sensor and the third angular velocity detection sensor;
wherein the attitude estimation unit further estimates the moving velocity in the direction of advance of the movable body;

wherein the attitude estimation unit estimates the offset error for the first acceleration detection sensor, the second acceleration detection sensor or the third acceleration detection sensor;

wherein the attitude estimation apparatus provides the estimated attitude of the movable body to at least one of a navigation system or a headlight driving system to control the at least one of the navigation system or the headlight driving system, or controls at least one of a driving power, braking force or suspension of the movable body based on information relating to the estimated attitude of the movable body;

wherein the attitude estimation unit includes a Kalman filter configured to, in the current estimation operation, estimate the roll angle and pitch angle of the movable body and the offset error for the at least one detection sensor using a relationship between the detected value from the first angular velocity detection sensor, the detected value from the second angular velocity detection sensor, the detected value from the third angular velocity detection sensor, the detected value from the first acceleration detection sensor, the detected value from the second acceleration detection sensor, the detected value from the third acceleration detection sensor, the detected value from the velocity information detection sensor, the estimated value of the roll angle from the previous estimation operation, the estimated value of the pitch angle from the previous estimation operation, and the estimated value of the offset error from the previous estimation operation; and wherein, in the current estimation operation, the Kalman filter estimates the roll angle and pitch angle of the movable body and the offset error for the at least one detection sensor using a characteristic equation in which a value of a predetermined function is a constant, the function having, as elements, the detected value from the first angular velocity detection sensor, the detected value from the second angular velocity detection sensor, the detected value from the third angular velocity detection senior, the detected value from the first acceleration detection sensor, the estimated value of the roll angle from the previous estimation operation, the estimated value of the pitch angle from the previous estimation operation, and the estimated value of the offset error from the previous estimation operation.

2. The attitude estimation apparatus according to claim 1, wherein the first acceleration detection sensor detects an acceleration of the movable body in a top bottom direction, and the attitude estimation unit estimates the offset error for the first acceleration detection sensor based on the detected acceleration of the movable body in the top-bottom direction.

3. The attitude estimation apparatus according to claim 1, wherein the first angular velocity detection sensor detects a roll angular velocity of the movable body,
the second angular velocity detection sensor detects a yaw acceleration of the movable body, and
the third angular velocity detection sensor detects a pitch angular velocity of the movable body.

4. The attitude estimation apparatus according to claim 1, wherein the characteristic equation is an equation derived from an equation of a rotary motion of the movable body about the first axis.

5. The attitude estimation apparatus according to claim 1, wherein the at least one of the electronic control unit or electronic circuitry are further configured to implement:

a load estimation unit configured to estimate a load applied to at least one of a front wheel or a rear wheel included in the movable body, where the load estimation unit estimates the load based on the detected value from the first angular velocity detection sensor, the detected value from the second angular velocity detection sensor, the detected value from the third angular velocity detection sensor, the detected value from the first acceleration detection sensor, the detected value from the second acceleration detection sensor, the detected value from the third acceleration detection sensor, the detected value from the velocity information detection sensor, and the roll angle of the movable body, the pitch angle of the movable body and the offset error for the at least one detection sensor estimated by the attitude estimation unit.

6. The attitude estimation apparatus according to claim 5, wherein the at least one of the electronic control unit or electronic circuitry are further configured to implement:

a suspension stroke quantity estimation unit configured to estimate a stroke quantity of a suspension provided on at least one of the front wheel or the rear wheel of the movable body, where the load estimation unit estimates loads applied to both the front wheel and the rear wheel provided on the movable body, and the suspension stroke quantity estimation unit estimates the stroke quantity of the suspension based on estimated values of the loads applied to both the front wheel and the rear wheel estimated by the load estimation unit.

7. The attitude estimation apparatus according to claim 6, wherein the at least one of the electronic control unit or electronic circuitry are further configured to implement an elevation/depression angle estimation unit configured to estimate an elevation/depression angle based on an estimated value of the stroke quantity of the suspension estimated by the suspension stroke quantity estimation unit, the elevation/depression angle being an angle between an axis in a vehicle-body coordinate system fixed to the movable body and an axis in a road-surface coordinate system fixed to a road surface in contact with the front wheel or the rear wheel.

8. The attitude estimation apparatus according to claim 7, wherein the attitude estimation unit estimates the roll angle and pitch angle of the movable body and the offset error for the at least one detection sensor taking account of an estimated value of the elevation/depression angle estimated by the elevation/depression angle estimation unit.

9. The attitude estimation apparatus according to claim 7, wherein the at least one of the electronic control unit or electronic circuitry are further configured to implement a slope estimation unit configured to estimate a longitudinal slope of the road surface based on the estimated value of the elevation/depression angle estimated by the elevation/depression angle estimation unit and estimated values of the roll angle and the pitch angle of the movable body estimated by the attitude estimation unit.

10. The attitude estimation apparatus according to claim 8, wherein the at least one of the electronic control unit or electronic circuitry are further configured to implement a slope estimation unit configured to estimate a longitudinal slope of the road surface based on the estimated value of the elevation/depression angle estimated by the elevation/depression angle estimation unit and estimated values of the roll angle and the pitch angle of the movable body estimated by the attitude estimation unit.

11. A transportation machine comprising:
the movable body; and
the attitude estimation apparatus according to claim 1.

\* \* \* \* \*